(12) United States Patent
Abedi

(10) Patent No.: US 8,140,018 B2
(45) Date of Patent: Mar. 20, 2012

(54) COMMUNICATION SYSTEMS

(75) Inventor: Saied Abedi, Reading (GB)

(73) Assignee: Fujitsu Limited, Kawasaki (JP)

( * ) Notice: Subject to any disclaimer, the term of this patent is extended or adjusted under 35 U.S.C. 154(b) by 542 days.

(21) Appl. No.: 12/314,842

(22) Filed: Dec. 17, 2008

(65) Prior Publication Data

US 2009/0191906 A1    Jul. 30, 2009

(30) Foreign Application Priority Data

Jan. 28, 2008   (GB) .................................. 0801537.2

(51) Int. Cl.
*H04B 1/00* (2006.01)
(52) U.S. Cl. ...................... 455/63.1; 455/63.2; 455/63.3
(58) Field of Classification Search .................. 455/63.1
See application file for complete search history.

(56) References Cited

U.S. PATENT DOCUMENTS

| 6,909,879 B1 * | 6/2005 | Centore, III .................. 455/63.1 |
| 7,177,598 B2 * | 2/2007 | Klein et al. .................... 455/63.1 |
| 7,242,907 B2 * | 7/2007 | Garrison et al. ............. 455/63.1 |

FOREIGN PATENT DOCUMENTS

| EP | 1339251 A2 | 8/2003 |
| EP | 1659814 A1 | 5/2006 |
| EP | 1732338 A1 | 12/2006 |
| EP | 1744571 A1 | 1/2007 |
| GB | 2268857 | 7/1993 |
| WO | 02087093 | 10/2002 |
| WO | 03026218 A1 | 3/2003 |
| WO | 2004004140 A2 | 1/2004 |
| WO | 2006045097 | 4/2006 |
| WO | 2007122297 A1 | 11/2007 |

OTHER PUBLICATIONS

United Kingdom Search Report dated Mar. 25, 2008 for application No. GB0801537.2.
J.-P. Kermoal, et al. "Spectrum Sharing for Winner Radio Access Networks" Cognitive Radio Oriented Wireless Networks and Communications, 2006. 1st International Conference on, IEEE, PI Jun. 1, 2006, pp. 1-5, XP031091953 ISBN: 978-1-4244-0380-6.
European Search Report dated Mar. 30, 2010 in corresponding application No. 09150211.2-2412/2083594.

* cited by examiner

*Primary Examiner* — Hai L Nguyen
(74) *Attorney, Agent, or Firm* — Murphy & King, P.C.

(57) ABSTRACT

A wireless communication system is comprised of multiple radio access networks—RANs—which at least partly share the same frequency spectrum. Each RAN is provided with a gateway—GW—(GW1, GW2, GW3) for managing the network. Spectrum sharing in the system is achieved through a hierarchy of processes including long-term—LT—spectrum assignment, short-term—ST—spectrum assignment, and dynamic channel allocation, the latter process assigning sub-channels to base stations (BS1, ... BS5; BS6, ... BS10; BS11, ... BS16) in each RAN. However, so-called "red" sub-channels (subject to interference) are liable to arise.

16 Claims, 33 Drawing Sheets

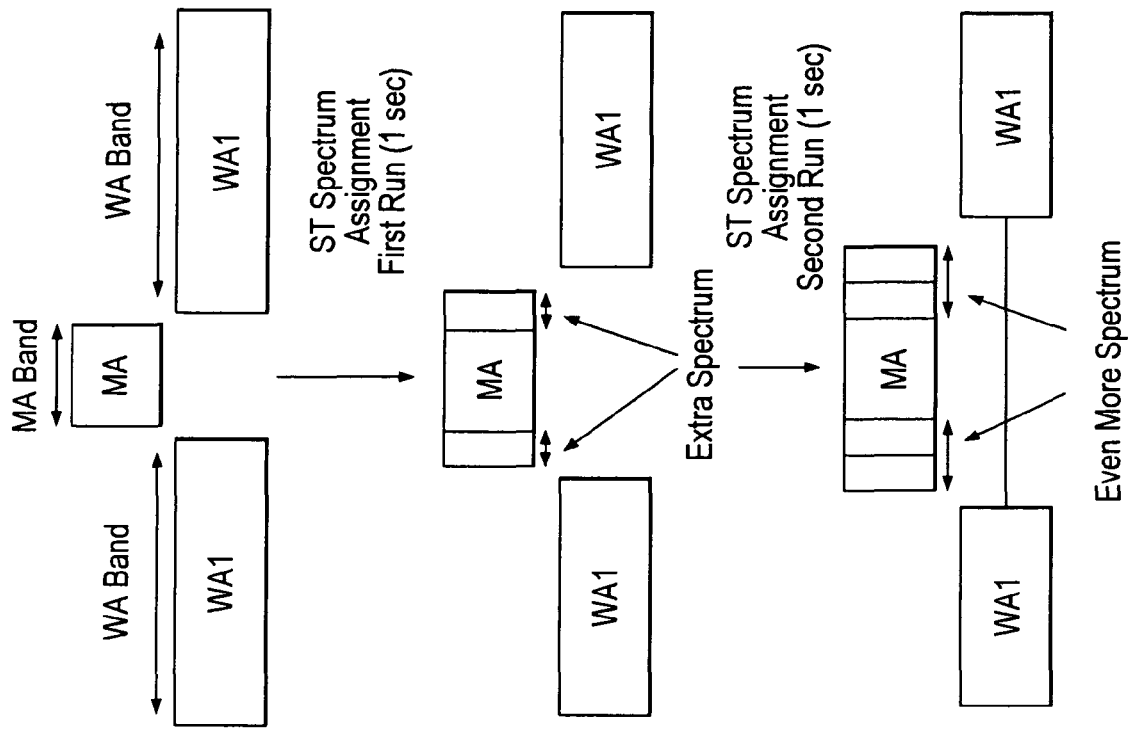
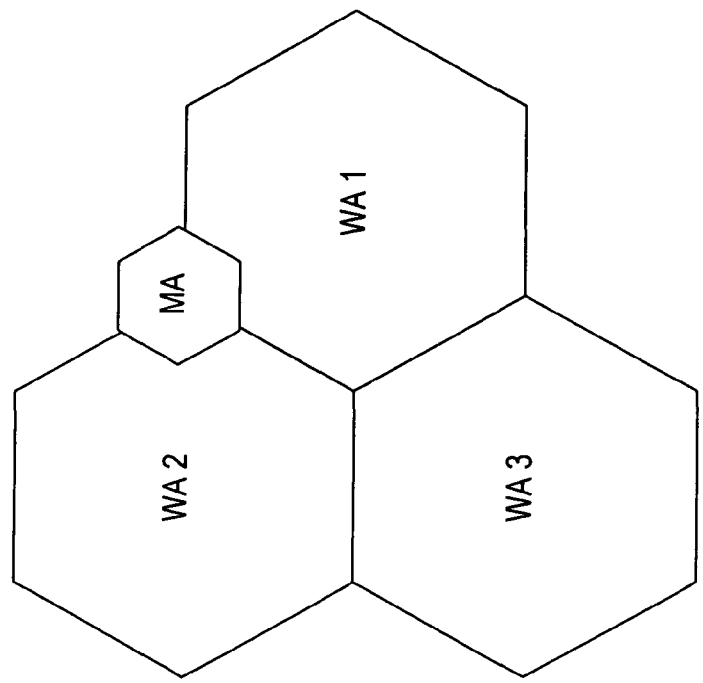
Fig.8

COMMUNICATION SYSTEMS

FIELD OF THE INVENTION

The present invention relates to interference mitigation in wireless communication systems, more particularly to systems in which multiple networks (radio access networks or RANs) co-exist.

BACKGROUND OF THE INVENTION

In a radio access network, communication apparatuses of the network generally communicate (with one another, and/or with other communication apparatuses) using radio transmissions that share the same transmission medium (commonly, the surrounding atmosphere). Although such radio transmissions are normally configured to occupy allocated or assigned frequency bands (also called sub-channels, and which may be divided in time to form "chunks"), the radio-frequency spectrum is nevertheless shared by such transmissions.

Radio transmissions occupying the same parts of the shared communication spectrum can interfere with one another. The level of interference will depend on a number of factors, for example on the power levels of the respective transmissions, and on the relative locations of the transmitters. In fact, many factors have an impact on interference.

Considering a radio access network (RAN) comprising base stations (BSs) as an example, these factors include antenna orientation in the BSs, transmission schemes employed (say FDD or TDD) by the BSs, the nature of sectorisation within the cells of the BSs, the power control schemes employed, the handover schemes employed, the nature of traffic being handled by the BSs at each point in time, and the number of active subscribers (e.g. user equipment, or UEs) assigned to each BS at each point in time. Any smart antenna scheme employed in the BSs may also affect interference. Considering the impact of transmission power on interference, it is possible that a BS may be assigned a number of separate sub-channels that may use different transmission power levels. These different power levels can affect interference. Another important factor is the interference leakage between two adjacent sub-channels. Although in telecommunications systems the practical solution is to introduce guard bands to reduce such leakage, the arrangements of sub-channels assigned to a BS can nevertheless affect interference. Other important factors regarding interference may be, for example, surrounding atmospheric conditions and the presence or absence of obstructions to signal propagation. The effect of interference can be signal degradation and an overall drop in system performance as a whole, as compared to that in an "interference-free" system. It is therefore desirable to manage resource allocation or assignment within RANs.

This is particularly the case when a plurality of RANs co-exist, in other words operate at the same time in adjacent or overlapping geographical areas, and frequency spectra. Such multiple RANs may be considered as parts of an overall or total wireless communication system in a geographical region of interest. Efforts are currently being made to improve the abilities of such multiple RANs to co-exist and coordinate themselves; for example the so-called WINNER project.

FIG. 1 shows one way in which multiple RANs can be co-ordinated. Here, an overall system is constituted by a number of Radio Access Networks RAN1, RAN2 and RAN3 which each comprise a Gateway GW for the purpose of accessing the RAN from a higher Core Network CN 6, typically via an IP Network. As proposed in WINNER for example, the GW is responsible for long-term spectrum assignment (see below) and for at least part of the radio resource management (RRM) in its RAN. It is assumed that one GW is assigned for each RAN.

Each RAN may also comprise one or more Base Stations (BS) exemplified in the Figure by BS1, BS2, BS3, each of which is connected to at least one GW. Each such BS may transmit (and receive) radio signals to (and from) one or more User Equipments (UEs), within its geographical area of coverage (often referred to as a "cell"). UEs may also be referred to as user terminals (UTs), terminal equipments (TEs) or Mobile Stations (MSs). Since both base stations and user terminals are equipped to transmit and receive signals over one or more of the RANs, they are sometimes referred to below collectively as transceivers. As explained in more detail below, base stations and their UEs may be grouped into "clusters" extending over one or more adjacent or even non-adjacent cells, for spectrum allocation purposes.

Communications between the CN, GWs and BSs may be across wired communication links (e.g. via fiber-optic links) or across wireless communication links (e.g. across radio or microwave links). As indicated by arrows in FIG. 1, the GWs communicate among themselves, for example for the purpose of long-term (LT) spectrum assignment, as will be explained later. Meanwhile, the BSs communicate among themselves for, among other things, short term (ST) spectrum assignment as will also be explained below. Communications between the BSs and the UEs are typically across wireless links.

The CN may be distributed, for example across the IP network. The IP network may, for example, include the Internet. Although three RANs are shown in FIG. 1, the network may include any number of such RANs. Similarly, each RAN may have any number of GWs, BSs and UEs. The UEs may be mobile and move from the cell of one BS to that of another BS, and even from one RAN to another RAN. The BSs may be dedicated to a particular RAN, or may be shared between RANs on a temporary or non-temporary basis. One BS may for example serve two RANs at the same time. Although the RANs in FIG. 1 are made up of the same component apparatuses, they may employ different radio access technologies. Typically, different RANs may be operated by different mobile-network operators. Different RANs and BSs may have separate geographical areas of coverage, or may have partially or fully-overlapping areas of coverage. For example, one RAN may effectively be co-located with another RAN, perhaps by siting their respective base stations at the same sites or in the same housings.

The above is only one general type of radio access network. In this specification, the term radio access network or RAN also encompasses a wireless sensor network (WSN) in which the nodes are sensors of some kind, configured to at least act as transmitters (and sometimes also act as receivers). One special form of wireless sensor network is a so-called Body Area Network or BAN, in which sensors are placed at one or more positions on or in living bodies for the purpose of monitoring medical parameters or bodily activity. Two forms of BAN are MBAN or Medical BAN for use in hospitals and other health-related applications, and Wireless BAN or WBAN, this more general designation also extending to security applications for example.

The sharing of radio frequency spectrum in such networks is of particular concern, given the intense proliferation of UE usage in recent years, and the expected increase in the number of UEs in circulation in the near future. In this respect, the requirements of radio systems are changing. While some systems and mobile operators may starved of spectrum resources, most of the existing radio spectrum resources may remain under-utilised or unused most of the time. In the design of wireless radio infrastructure, as in WINNER for example, it is therefore desirable to attempt to share the already existing spectrum in a way which would ultimately lead to better utilisation, thereby solving the problem of poor utilisation of spectrum in the presence of an increasing demand for wireless connectivity. One aspect of such spectrum sharing is to identify so-called "white spaces" in time, frequency and space which are not currently occupied by one RAN, allowing another RAN to transmit in these white spaces.

However, given the potential for interference as already noted, interference management, also referred to below as interference mitigation, is essential for allowing efficient sharing and utilization of spectrum between co-existing RANs.

The concept of "interference temperature" has been proposed for use in managing interference between different RANs. This concept uses the fact that it is the interference level at the affected receiver, rather than at the transmitter causing the interference, which is important to determine the impact of a transmission on other networks. By limiting the total interference experience at a given receiver, it is possible to allow transmitters to operate in frequency bands (sub-channels or chunks) already allocated to other RANs whilst protecting those other networks from undue interference. In practice, it is unrealistic to expect each transmitter to obtain the necessary information for estimating how their emissions would affect the interference temperature of nearby receivers. Nevertheless, the concept of "interference temperature" is useful for classifying the level of interference experienced in particular frequency bands by receivers and groups (e.g. clusters) of receivers.

Efficient coordination between interference control agents in co-existing RANs can contribute to a better quality-of-service (QoS) across all the involved RANs. The inventor of the present invention has recently proposed a semi-distributed cluster wide approach for dynamic channel allocation and so-called gateway centralised interference mitigation to permit efficient interference management within a RAN. However, an outstanding problem is that on some occasions any one GW in isolation might be unable to have full control on interference inflicted on its own RAN from other RANs. The reason for this is that it can only control the sub-channel allocation in its own RAN, and has no influence on other RANs' interference mitigation and sub-channel allocation processes. It is desirable to overcome this shortcoming by providing efficient methods for a GW-to-GW coordination for an efficient interference mitigation and radio sub-channel allocation.

SUMMARY OF THE INVENTION

According to a first aspect of the present invention, there is provided an interference mitigation method for use in a wireless communication system formed by a plurality of radio access networks, each radio access network having a network manager arranged for communication with a plurality of nodes associated with the network manager, and each radio access network having a frequency spectrum divisible into a plurality of sub-channels used for wireless communication by the nodes, the frequency spectrum at least partly overlapping with the frequency spectrum of one or more of the other radio access networks; the method comprising the steps of: the network manager of each radio access network performing a spectrum assignment process for allocation of sub-channels to its nodes; the nodes of each radio access network performing wireless communication using their allocated sub-channels; the network manager of one radio access network receiving, from its associated nodes, data indicative of an actual level of interference being experienced by the nodes, the interference arising either internally within the radio access network or externally from the other radio access networks; the network manager of the one radio access network comparing the actual level of interference with an estimated level of interference arising internally within the radio access network to determine whether there is a need for coordination with another network manager to reduce interference arising externally, and if so:—the network manager of the one radio access network notifying this need to the network manager of at least one of the other radio access networks; and the network manager of the other radio access network performing again the spectrum assignment process to its associated nodes to reduce the level of interference being experienced by the nodes of the one radio access network.

In this method, preferably, the comparing step involves determining whether the actual level of interference exceeds the estimated level by at least a threshold amount.

Preferably also, if the network manager of the one radio access network determines there is no need for coordination with another radio access network to reduce the interference, the network manager performs again the spectrum assignment process to its associated nodes in an attempt to reduce the interference arising internally within the radio access network.

Where the nodes of the system are transceivers, the receiving step is preferably initiated by the network manager obtaining the estimated level of interference, detecting that the estimated level exceeds a predetermined level, and requesting the nodes to send the data indicative of the actual level of interference.

The data indicative of the actual level of interference being experienced by the nodes preferably includes data on each sub-channel affected by interference. More particularly, it may include an identification of sub-channels consistently affected by interference over successive time periods used for communication in the radio access network.

The network manager of the one radio access network preferably compiles a list of affected sub-channels and notifies the list to the network manager of the at least one other radio access network. Then, the network manager of the other radio access network performs the spectrum assignment process based on the list of affected sub-channels. The network manager of the one radio access network may further notify the list to a spectrum manager of the wireless communication system, the spectrum manager setting guard bands in the frequency spectrum for one or more of the radio access networks based on the list of affected sub-channels.

In addition, preferably, the network manager of the one radio access network further notifies the list to a sharing entity of the wireless communication system, the sharing entity determining sharing of the frequency spectrum or defining spectrum boundaries for the radio access networks based on the list of affected sub-channels.

The interference arising externally can include interference caused by assigning the same sub-channels to nodes in different radio access networks, and the network manager of the other radio access network may attempt to perform the spectrum assignment process to its associated nodes by avoiding the affected sub-channels.

In this case, preferably, the network manager of the other radio access network first attempts to perform the spectrum assignment completely, considering all possible combinations of the remaining sub-channels, and if this is not possible, performs the spectrum assignment so as to avoid as many as possible of the affected sub-channels.

Alternatively, or in addition, the network manager of the other radio access network performs the spectrum assignment by assigning on a random basis the sub-channels other than the affected sub-channels to its associated nodes.

Preferably, the network manager of the other radio access network performs the spectrum assignment process by considering also interference experienced by its associated nodes.

The network manager of the other radio access network may inform the network manager of the one radio access network of completion of performing again the spectrum assignment process.

In a typical application, at least one of the radio access networks is a cellular mobile communication system. At least one such mobile communication system may be a WINNER system, the network manager of which is a gateway of the WINNER system.

In the or each such WINNER system, the spectrum assignment process performed by the gateway is preferably a dynamic radio channel allocation process of assigning sub-channels to nodes on a time scale shorter than long-term and short-term spectrum assignment.

In addition, at least one of the radio access networks is a satellite-based network, or an industrial, scientific and medical band network, or a body area network.

In the system, the nodes will usually include base stations of the radio access network in which they are comprised, each base station performing a resource allocation process to connected user terminals of the base station using the sub-channels allocated by the network manager. Typically also, the nodes will include user terminals of the radio access network in which they are comprised.

A wired link may be provided for communication between each network manager and its associated nodes. Alternatively, a wireless link can be used for this.

According to a second aspect of the present invention, there is provided a wireless communication system comprising a plurality of radio access networks, each radio access network having a network manager associated with a plurality of nodes in communication with the network manager, and each radio access network having a frequency spectrum divisible into a plurality of sub-channels for use in wireless communication by the nodes, the frequency spectrum at least partly shared with the other radio access networks; wherein the network manager of each radio access network comprises: spectrum assignment means for allocation of sub-channels to its nodes; interference estimating means for estimating a level of interference expected to arise internally within the radio access network during the wireless communication; comparing means for comparing the estimated level of interference with an actual level of interference affecting the nodes associated with the network manager; and notifying means operable, in the event that the actual level exceeds the estimated level by more than a predetermined threshold, to notify at least one of the other network managers of an interference state; wherein the spectrum assignment means is responsive to a request from any other network manager to repeat the allocation of sub-channels to its nodes whilst taking into account the interference state notified from that other network manager.

Preferably, at least one of the radio access networks is a mobile communication system in which the nodes are transceivers. More particularly, at least one such mobile communication system may be a WINNER network in which the network manager is a WINNER gateway and the transceiver nodes include base stations of the WINNER network.

Alternatively, at least one of the radio access networks is a wireless sensor network. This can include a body area network in which the nodes include sensors acting at least as transmitters in the network. In such a wireless sensor network RFID devices may act as the nodes.

According to a third aspect of the present invention, there is provided a network manager of one of a plurality of radio access networks making up a wireless communication system, comprising: means for communicating over a wired or wireless link with each of a plurality of nodes associated with the network manager; spectrum assignment means for allocating sub-channels, within a frequency spectrum available for use by the radio access network and at least partly shared with the other radio access networks, to the nodes for their use in wireless communication; interference estimating means for estimating a level of interference expected to arise internally within the radio access network in the course of the wireless communication; comparing means for comparing the estimated level of interference with an actual level of interference experienced by the nodes in the course of the wireless communication, including both interference arising internally within the radio access network and interference inflicted externally from the other radio access networks; and notifying means operable, in the event that the actual level exceeds the estimated level by more than a predetermined threshold, to notify at least one of the other network managers of an interference state; wherein the spectrum assignment means is responsive to a notification from any other network manager to repeat the allocation of sub-channels to its nodes whilst taking into account an interference state notified from that other network manager.

The network manager may be contained in a gateway of a WINNER radio access network.

In the above, the term "wireless communication system" is used to denote an overall grouping of radio access networks—RANs—within a particular region of geography or space, each RAN including all of the elements of the network, for example base stations. An example of a RAN would be an OFDM-based system of the kind proposed in WINNER, in which spectrum assignment is made in terms of "chunks" each consisting of a rectangular space-time area that comprises a number of OFDM symbols and a number of adjacent subcarriers. In such a system, data transmissions occurs in time units of "frames" each containing a number of chunks. Another example of a RAN would be the body area network or BAN mentioned above.

By "frequency spectrum" is meant radio frequencies or any other range of frequencies of electromagnetic radiation suitable for communication, for example, the radio frequency range of the electromagnetic spectrum. Additionally or alternatively, the RANs may operate within a microwave frequency range, for example. The term "radio" in "radio access network" is thus to be interpreted broadly. At least part of the spectrum may be common or shared among the RANs thus leading to the potential for interference.

By "sub-channel" is meant primarily a subdivision of the available frequency spectrum along the frequency axis; however, the division is usually made also on a time basis, and possibly also on a spatial basis (particularly where multiple antennas are employed). The term "sub-channel" is thus to be interpreted broadly as meaning any subdivision of the available radio resources in a RAN.

The term "node" relates to wireless equipment which is capable of undertaking wireless communications within one or more of the RANs, or in other words any radio entity in a RAN. At a minimum, such a node should be capable of at least transmitting data to the network manager. Usually, the nodes will be transceivers capable of both receiving and transmitting information, and typically, they will be base stations in a mobile communication system. In another arrangement, a node may be an RFID device such as tag or a tag reader, or a sink or wireless sensor network base station. In a further arrangement—in a group of stationary or moving human or animal bodies constituting a system of BANs as mentioned above—the nodes may be sensors on or in a particular body being monitored, each such body typically having its own BAN.

When the nodes of the above aspects are base stations, these sub-allocate resources to any user terminals which may be connected to them, and such sub-allocation may proceed independently of the present invention. However, the term "node" may also relate to the user terminals themselves, for example a mobile telephone, personal digital assistant, laptop or PC, to an RFID tag/node or wireless sensor node, where these have sufficient functionality to communicate directly with the network manager.

The term "network manager" covers any supervisory entity in a RAN, for example a gateway (GW) as provided in a WINNER RAN. Usually, only one network manager will be provided for one RAN; however, very wide-scale RANs (for example networks with a footprint extending over national boundaries) may have multiple managers.

In a further aspect, there is provided software which, when executed by one or more networked processors, provides the above-defined network manager. This may be either centralized at one point in the network, or distributed. The software may be recorded on a computer-readable medium.

BRIEF DESCRIPTION OF THE DRAWINGS

Reference will now be made, by way of example, to the accompanying drawings, in which:

FIG. 8 shows a geographical arrangement of three wide-area deployments or cells (WA 1, WA 2 and WA 3) and a metropolitan area deployment or cell (MA);

DETAILED DESCRIPTION

A system for spectrum sharing and coexistence of system apparatuses, including the possibility of spectrum exchange between two or more RANs has been considered, for the purposes of attaining better utilisation of spectrum for wireless mobile networks. An example of such a system is the WINNER project already mentioned, which is currently under development.

Figure 1:
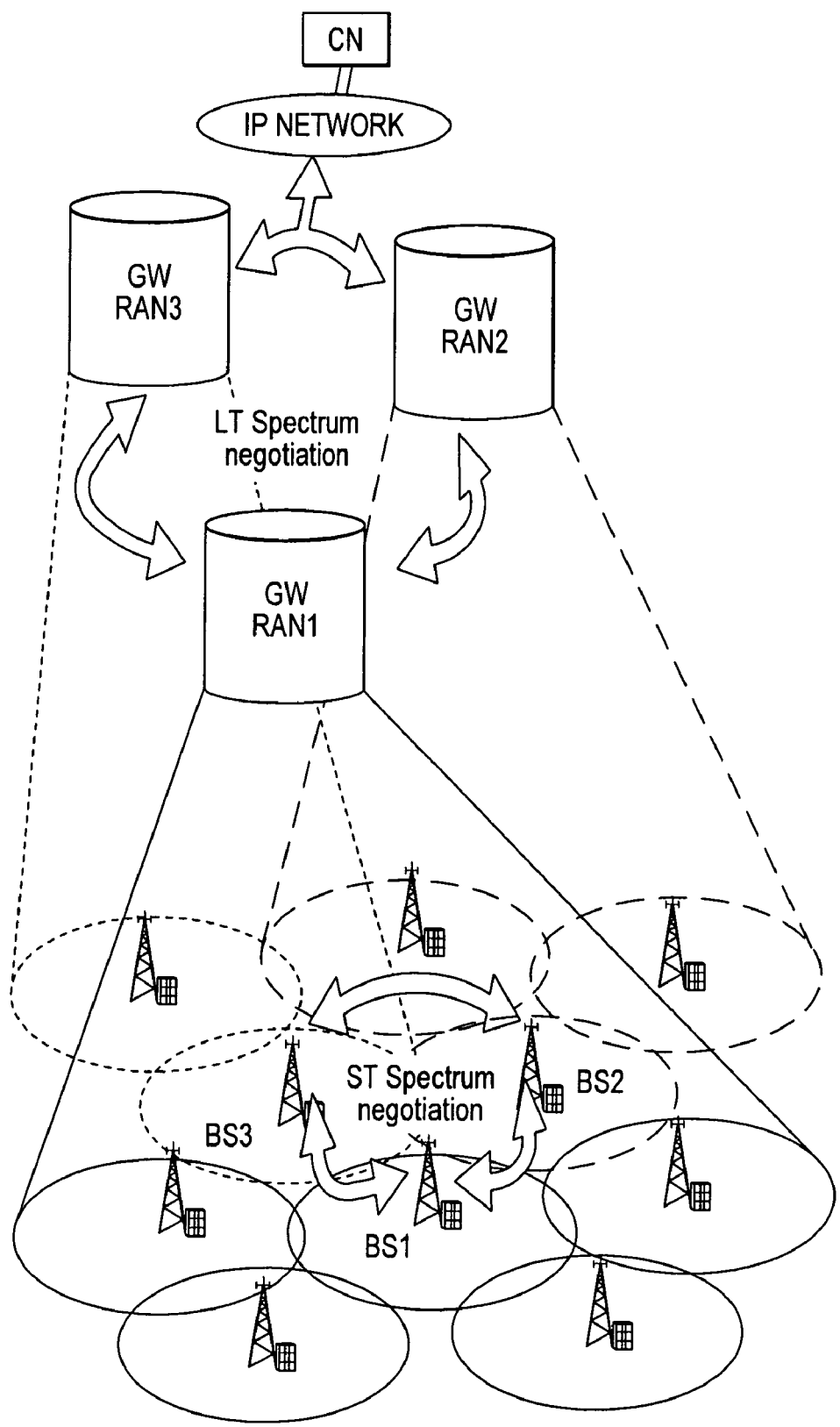
FIG. 1 is a schematic diagram of an example of a system encompassing multiple RANs.
Figure 2:
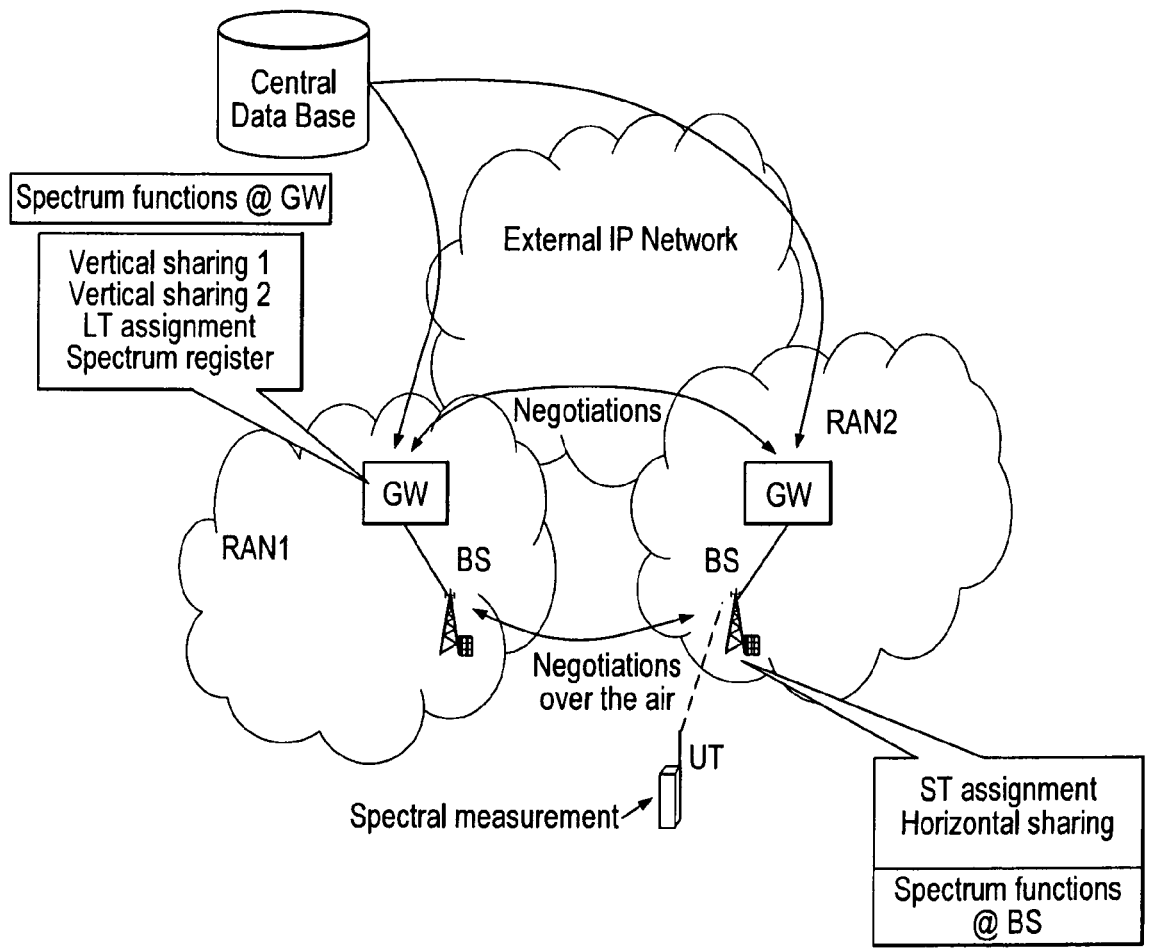
FIG. 2 is a schematic diagram of a simplistic network architecture useful for understanding the concept of spectrum sharing.

FIG. 2 is a schematic diagram of simplistic network architecture useful for understanding the concept of spectrum sharing. The network of FIG. 2 may to some extent be compared to the schematic diagram of FIG. 1. The basic idea is to enable independent RANs (Radio Access Networks) to use each other's spectrum when it is not needed. Negotiations between different RANs may be carried out by communications between the gateways of those RANs. The independent RANs may use the same technological standards (radio access technology), as envisaged in WINNER for example. On the other hand, the RANs may use different standards whilst overlapping or encroaching to some extent in the frequency spectrum each is able to use.

In FIG. 2, two RANs are shown, namely RAN 1 and RAN 2, each having a GW and a BS. FIG. 2 also shows a representative user terminal (user equipment) UT in radio contact with one BS. Communications are possible between the two GWs, either directly or indirectly. Both of the GWs have access to a central database, which may for example have a controlling functionality. This can be used for storing a spectrum register at gateway level. In this way, a record can be kept of the sharing of spectrum between systems, for example between RANs or BSs.

As indicated in FIG. 2, spectrum sharing is envisaged at the gateway level and/or at the base-station level. Depending on rules governing the sharing of different frequency bands, different approaches to spectrum sharing are envisaged. One such approach is referred to as horizontal sharing. So-called horizontal sharing may be carried out between systems or communication apparatuses of equal status, i.e. where no one network has priority over the others. Such horizontal sharing could be performed with or without coordination. Coordination may require capabilities for signalling or at least detection of other networks, and may involve coordination based on a predefined set of rules or "spectrum etiquette".

Another approach to spectrum sharing is referred to as "vertical sharing". So-called vertical sharing may be carried out between networks or communication apparatuses in which there are clearly established priorities. For example, there may be primary networks that have precedence in accessing the spectrum and secondary networks that may only use the spectrum providing they do not cause harmful interference towards the primary network(s). It is envisaged that spectrum-sharing enabled networks could be either primary or secondary networks as compared to legacy (non-spectrum-sharing enabled) networks. This leads to two types of vertical sharing, the first type ("Vertical Sharing 1" in FIG. 2) having the spectrum-sharing enabled network as the primary network, and the second type ("Vertical Sharing 2" in FIG. 2) having the legacy network as the primary network. Any user terminal UT may also be used to make spectral measurements to assist the spectrum-sharing process.

FIG. 2 indicates that both long-term spectrum assignment (LT assignment) and short-term spectrum assignment (ST assignment) may be carried out. These different functionalities may be understood as follows. Spectrum sharing may be used to periodically reassign a portion of the available spectral resources between different RANs. In contrast to fixed-spectrum assignment, spectrum sharing can enable dynamic balancing of spectral resources between networks. As a result, the spectral scalability of networks can be increased, and spectral resources available for a network can be adjusted according to changes in requirements. Such requirements may be financial/commercial requirements, for example relating to a network operator's customer base or market share. Such requirements may also be operational requirements, for example relating to loads on the respective networks. It will be appreciated that spectrum sharing may facilitate focused operation of communication networks resulting in limiting overall need for spectral resources. In addition, spectral resources may be re-assigned according to variations in the aggregate loads on respective networks, thereby enhancing the overall use of spectrum over a number of networks.

It is desirable that a spectrum-sharing functionality provides a communication network with stable, predictable and reliable access to the spectrum, whilst also reacting quickly to changing spectrum requirements between different networks of the system. By dividing spectrum sharing into LT spectrum assignment (providing slowly varying, stable spectrum assignments for large geographical areas) and ST spectrum assignment (providing short-term modifications of the large-scale solution), the stability and predictability required can be achieved with reasonable complexity.

Figure 3:
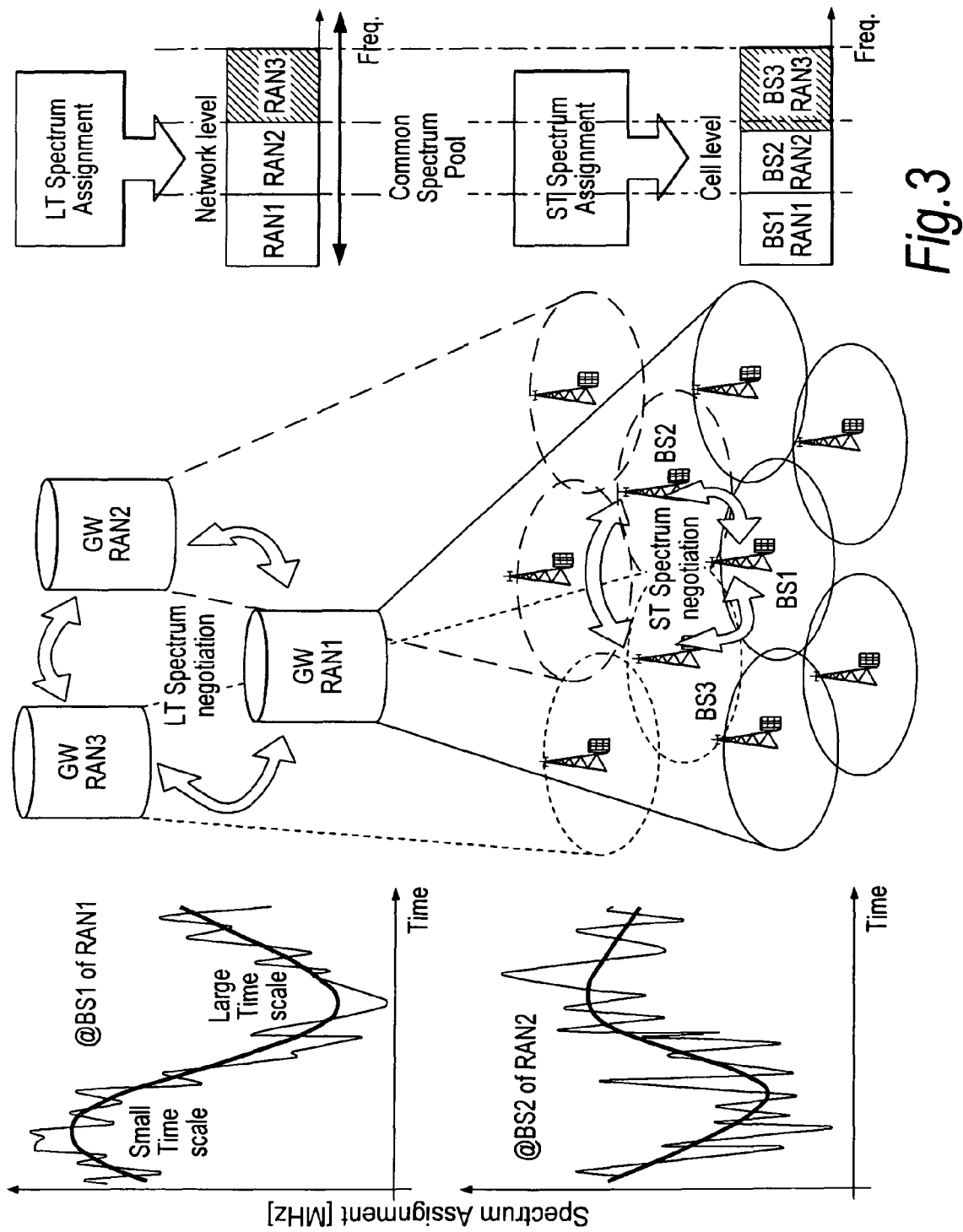
FIG. 3 illustrates LT and ST spectrum assignment in the system of FIG. 1.

FIG. 3 illustrates conceptually how LT and ST spectrum assignment occur in a system of the FIG. 1 type. Here, BS1 from RAN1, BS2 from RAN2 and BS3 from RAN3 are engaged in ST spectrum negotiations. It is assumed that the spectrum chunk (or other allocation) being exchanged is part of a shared common pool of spectrum. It is also the assumption that unlike each RAN's dedicated spectrum band, for example as explained later with reference to FIG. 5, none of the RANs has a priority in using the common pool. FIG. 3 (right-hand side) shows an example in which ST spectrum assignment leads to RAN3 taking part of the common pool, assigned in LT spectrum assignment to RAN2, away from RAN2.

Figure 4:
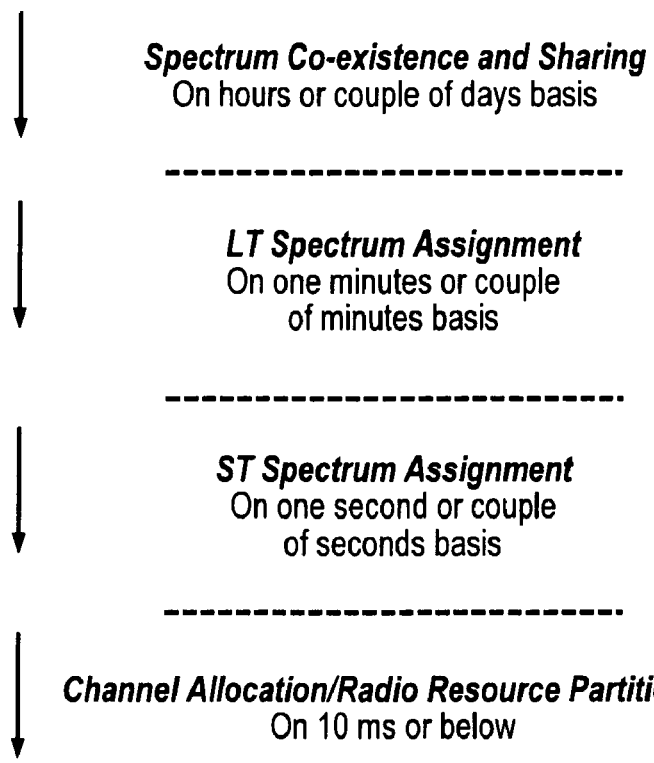
FIG. 4 shows a hierarchical structure of four stages for spectrum negotiations and management.

Based on the above, four stages for spectrum negotiations and management, also referred to below as spectrum functionalities, have been proposed as shown in FIG. 4. Not all four stages need be performed in every case, and any combination of those stages may be performed concurrently or in an ordered fashion.

Figure 5:
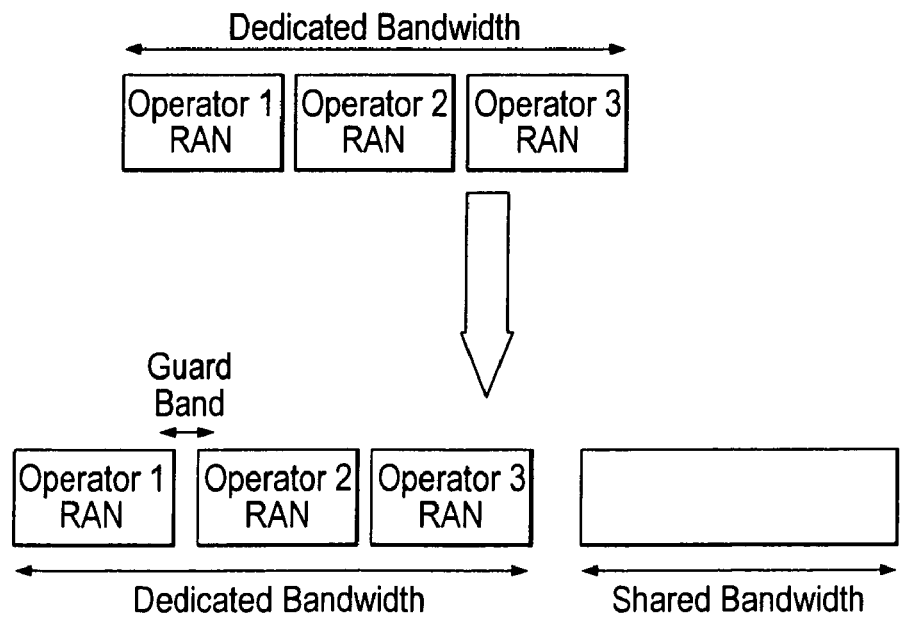
FIG. 5 is a schematic diagram showing a spectrum-sharing scenario.

The first stage may be referred to as "spectrum co-existence and sharing". In this first stage, RANs (for example belonging to different operators) may decide upon an amount of shared spectrum that is to be made available to one of those RANs beyond its existing dedicated spectrum band. A typical scenario is shown in FIG. 5. Three operators (Operator 1, Operator 2, and Operator 3) each have their own RAN (RAN 1, RAN 2, and RAN 3 respectively). Each such RAN has its own dedicated spectrum band (marked "Dedicated" in the Figure) separated from adjacent bands by means of a guard band. In addition, a shared spectrum band (marked "Shared") also exists, which can be made available to any of the RANs in addition to its dedicated spectrum band. The shared band need not be contiguous in frequency with the dedicated band.

The decision regarding the precise final boundaries of spectrum may be location dependent, depending for example on the nature of the area (e.g. metropolitan area, or local area) and on the coordinates of the area. A trade-off between spatial separation and frequency separation may also affect the precise final boundaries of assigned spectrum.

Figure 6:
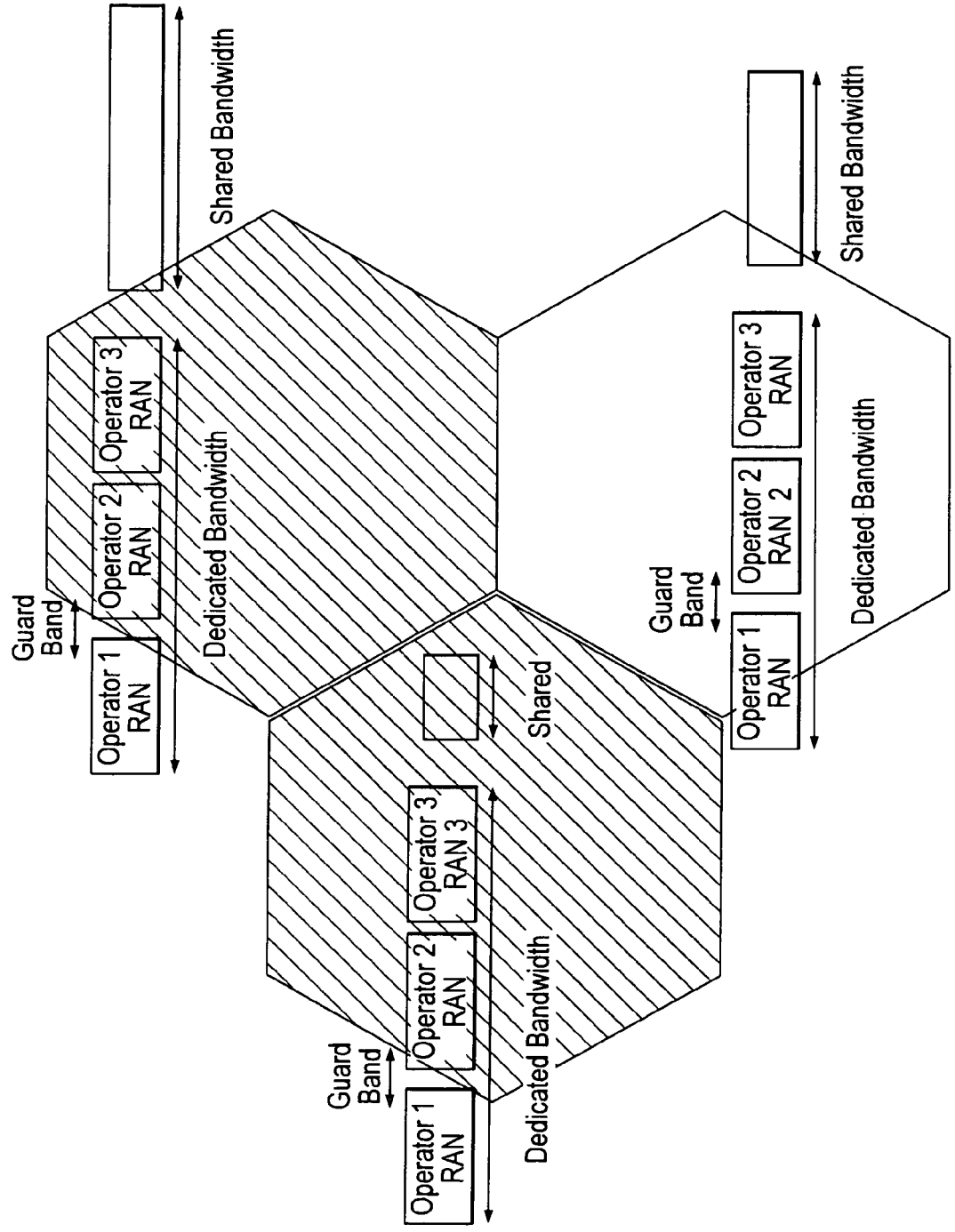
FIG. 6 is a schematic diagram of geographical areas of RAN coverage, known as cells.

This location dependency can be appreciated by reference to FIG. 6. In FIG. 6, three geographical areas of coverage, known as cells, are shown. The three RANs of the three operators have a presence in each of the cells, in other words they overlap geographically, however there are differences between the dedicated and shared spectrum allocations for the three RANs that move from cell to cell. That is, the initial boundaries of available spectrum (assuming that some spectrum sharing or re-assignment will take place) are different from cell to cell.

The second stage shown in FIG. 4 is the long-term (LT) spectrum assignment mentioned earlier. After making decisions about spectrum boundaries in stage 1, negotiations can occur between the GWs of different RANs (for example, belonging to different operators) on a regular or semi-regular basis, for example every couple of minutes. Such negotiations can serve to rearrange (re-allocate, or re-assign) the available spectrum to ideally maximize spectrum utilization between the different RANs, for example between a primary and secondary RAN. In this way, one RAN operator can trade in unused spectrum to maximize revenue from its own unused spectrum and improve QoS to its own subscribers by obtaining unused spectrum from other operators. It will of course be appreciated though that such spectrum sharing need not be influenced by financial factors, and may instead only be influenced by technical factors, for example by a desire to maximize spectrum utilization across several RANs.

Figure 7:
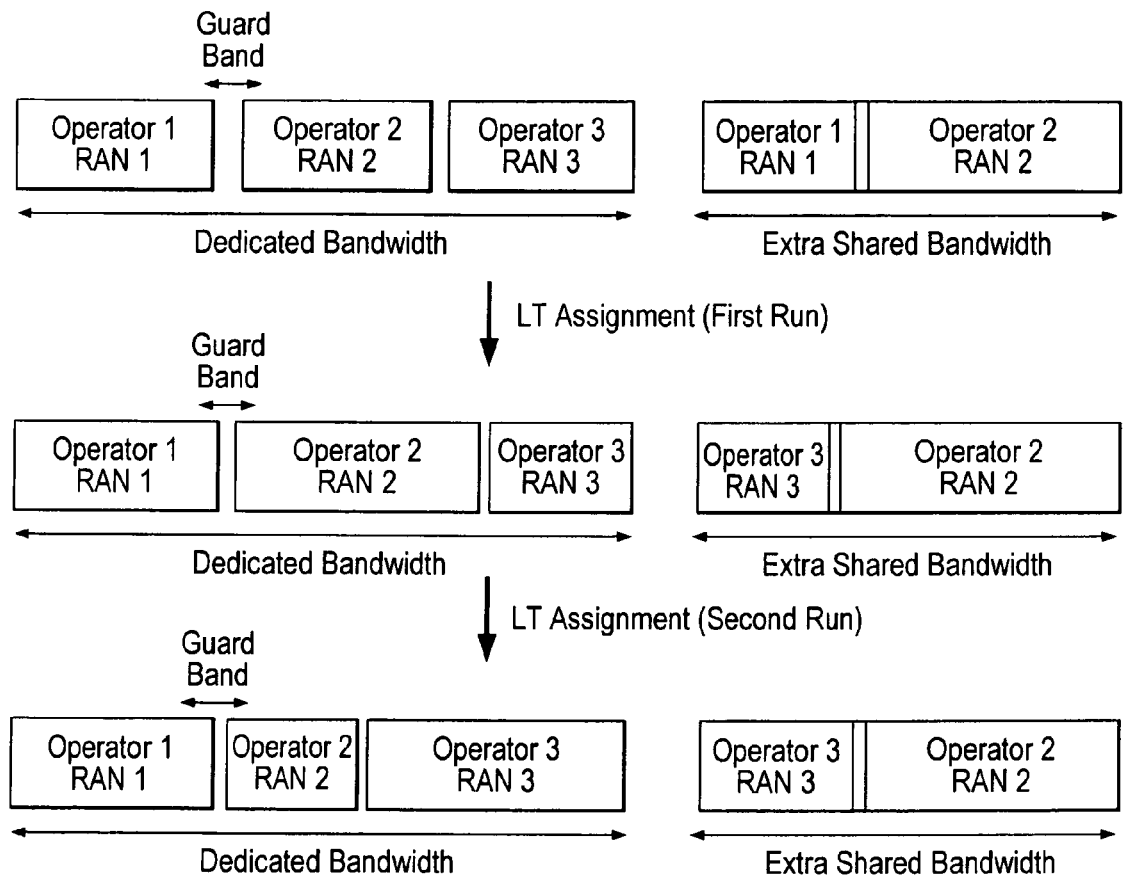
FIG. 7 is a schematic diagram for explaining long-term spectrum assignment.

By way of example, FIG. 7 indicates how spectrum may be re-assigned as part of the second stage. In FIG. 7, this second stage is performed twice by way of a first run and a second run. Before the first run, it can be seen that RANs 1 to 3 have a substantially equal dedicated bandwidth, and that RANs 1 and 2 share the extra shared bandwidth, albeit with RAN 2 having the larger such share. Following the first run, it can be seen that RAN 2 has increased the size (or frequency range) of its dedicated spectrum allocation by obtaining spectrum from RAN 3. Also, following the first run, RANs 3 and 2 share the extra shared bandwidth (RAN 1 no longer occupying any of the extra shared bandwidth). Following the second run, RAN 3 has increased the size of its dedicated spectrum allocation by obtaining spectrum from RAN 2. Also, following the second run, RANs 3 and 2 still share the extra shared bandwidth, but with RAN 3 (rather than RAN 2) having the larger such share. Accordingly, it can be appreciated from FIG. 7 that both dedicated and additional spectrum assignments may be changed from one run to the next.

The third stage is the short-term (ST) spectrum assignment referred to above. After making decisions about spectrum-allocation boundaries in stage 2, negotiations can occur locally between BSs on a short-term regular or semi-regular basis, for example every few seconds. It will be appreciated that the purpose of such short-term assignment in stage 3 is to augment the scheduled long-term assignment of stage 2 by allowing for faster spectrum assignments and, thus, increasing overall flexibility. Such short-term assignment can operate with the spatial granularity of a cell.

A possible scenario for the third stage is shown in FIG. 8. The left hand part of FIG. 8 shows a geographical arrangement of three wide-area deployments or cells (WA 1, WA 2 and WA 3) and a metropolitan area deployment or cell (MA). In the right hand part of FIG. 8, the effect of two runs of this third stage can be seen. Before the first run, the MA occupies a relatively small spectrum portion between portions of spectrum allocated or pre-assigned to WA 1. By means of the first and second runs, it can be seen that the MA progressively negotiates to obtain spectrum from the wide-area cells.

Figure 9:
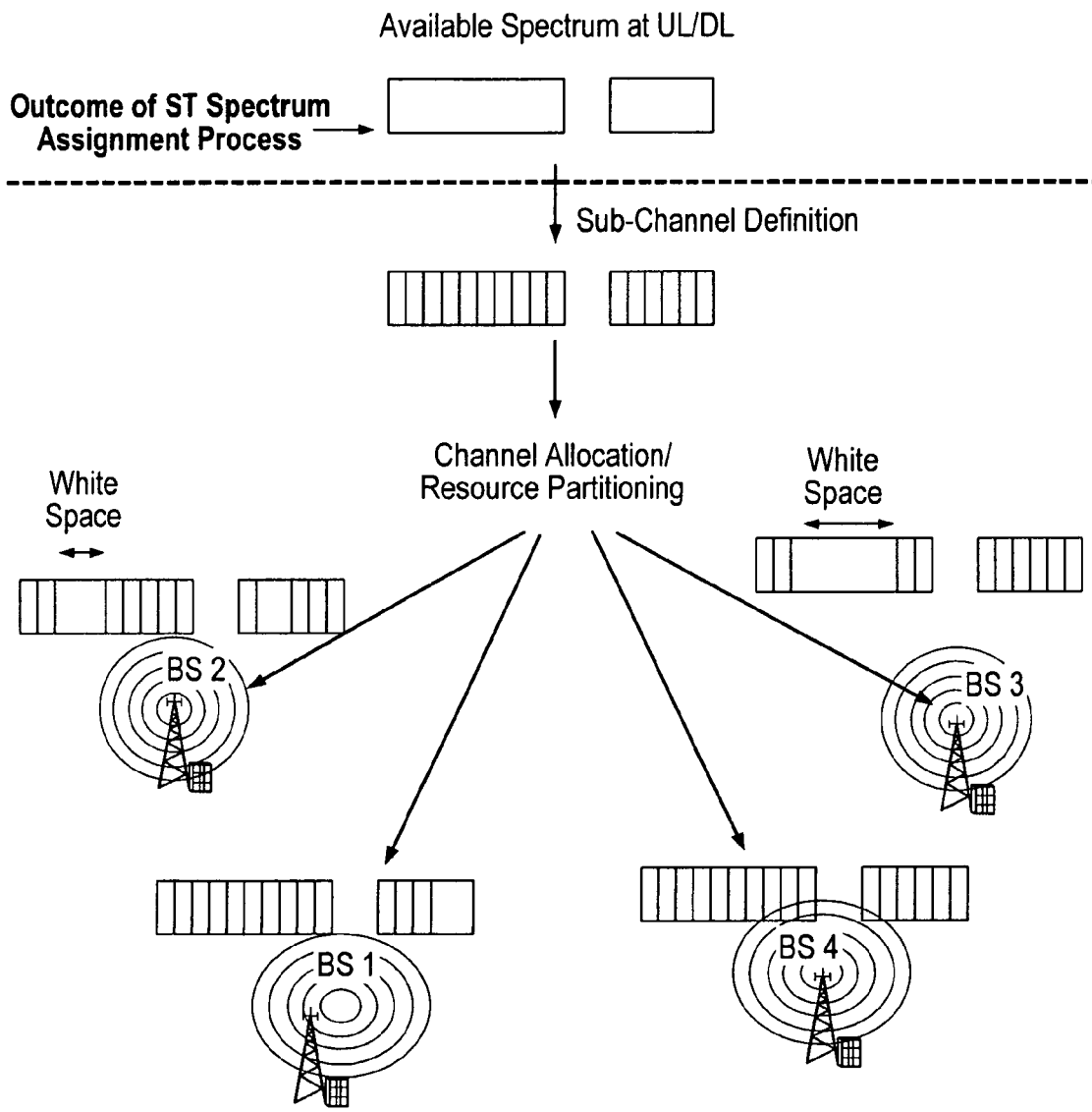
FIG. 9 is a schematic diagram representing spectrum allocation between BSs.

The fourth stage may be referred to as channel allocation/radio-resource partitioning. This stage decides which sub-channel should be allocated to which radio entity, and can be performed either in distributed manner (e.g. by the base stations) or centralized manner (by the GW). After a decision is reached in the third stage (i.e. on a short-term (ST) basis), decisions can be made in the fourth stage to allocate suitable sub-channels to each cell or base station on an extremely short-term basis, for example every couple of tens of milliseconds. This is depicted in FIG. 9. Whilst FIG. 9 only illustrates BSs, it is also possible to allocate sub-channels to each UE at this stage.

The time granularity of the above four stages or spectrum functionalities is shown in FIG. 4. While the three stages of Spectrum Sharing and Coexistence, LT Spectrum Assignment and ST Spectrum Assignment are responsible for defining the amount of spectrum available in the common spectrum pool and shaping the boundaries of spectrum over longer time scales, dynamic channel allocation divides the final available spectrum decided by ST Spectrum Assignment (e.g. just borrowed from another cell) into radio sub-channels and decides which radio sub-channel would be allocated to which radio entity on a fast millisecond timescale, in response to radio channel and traffic variation.

The sharing of spectrum by co-existing multiple RANs provides the potential for signals from one RAN to inflict interference on other RANs. Thus, as already mentioned, there is a need for co-ordination between the GWs of different RANs in order to provide effective interference mitigation. The present invention therefore proposes methods to coordinate interference mitigation beyond a gateway on an intra network (GW-to-GW) basis.

Figure 10:
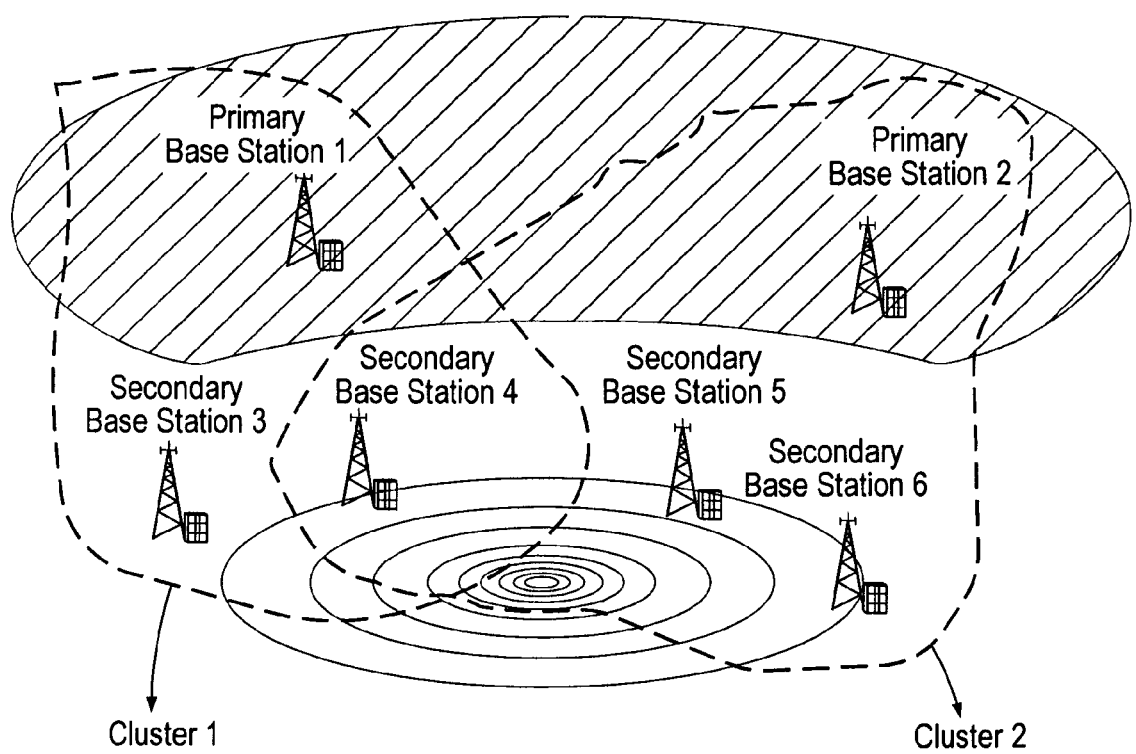
FIG. 10 illustrates how BSs may be organised into clusters for the purpose of spectrum assignment.

As a first step to providing interference mitigation, some assessment is needed of the interference currently being experienced by the BSs of a RAN. In this regard, it is sometimes useful to consider "clusters" of BSs, as schematically shown in FIG. 10. FIG. 10 shows a Cluster 1 having a lead or primary BS 1 along with other or secondary BSs 3 and 4. In addition a Cluster 2 has a Primary BS 2 together with secondary BS 5 and 6 and, in common with Cluster 1, includes Secondary BS 4. Thus, as shown it is possible for one BS to belong to more than one cluster or RAN at the same time.

In the following description, reference will be made to "red" and "blue" GWs, RANs, clusters, and sub-channels. These terms relate to the concept of interference temperature as mentioned above. A red GW is one whose RAN, or more correctly whose base stations within the RAN, experience (at least within a given frequency band and time duration) an unacceptably high level of interference. A blue GW is one for which the interference level in its associated RAN and BSs is acceptable. Entities (including sub-channels) in the network which suffer interference are also referred to below as "troubled".

Figure 11:
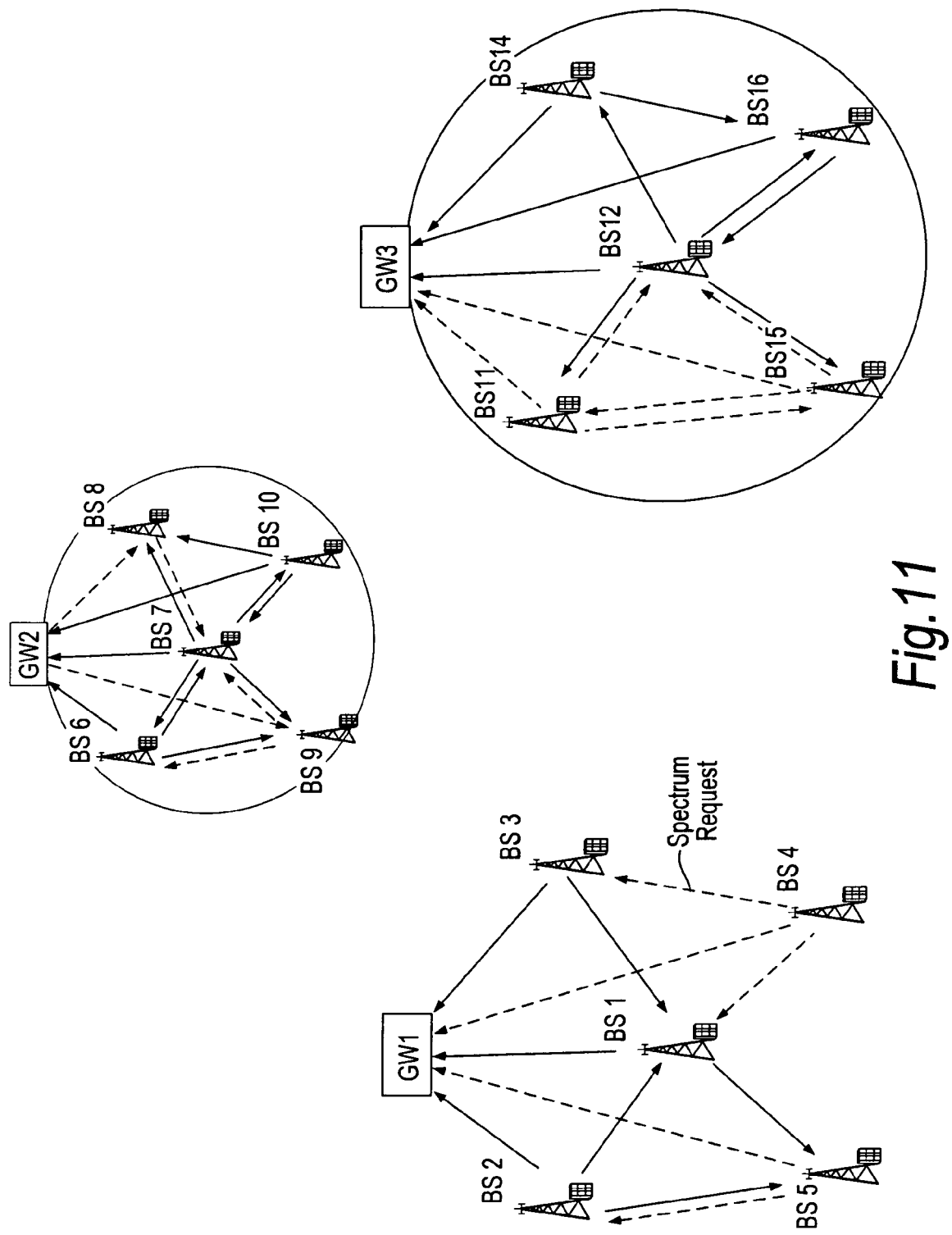
FIG. 11 illustrates a problem with GW-centralized interference co-ordination in a system of multiple RANs each having base stations.

As an illustration of a GW becoming "red" in the above sense, FIG. 11 shows the kind of situation which can occur if dynamic sub-channel allocation takes place only at the level of the individual gateway ("GW-centralized"). The arrows represent the potential communications and interfaces between the GWs and BS. It could happen, for example, that while the RANs assigned to GW 2 and GW 3 are in a low interference (blue) state, the RAN assigned to GW1 is partially or fully in a high interference (red) state. This could occur because GW-centralized channel allocation has no control on the dynamic interference mitigation or sub-channel allocation within other RANs involved in the spectrum sharing process.

To assist understanding of the method embodying the present invention described below, some theoretical discussion of interference among transceivers in a RAN will first be given.

We assume that the radio network consists of J transceiver nodes, for example BSs of a mobile communication network. These transceivers are fixed or they can move. They are distributed uniformly in a square region of dimension L×L. It is assumed that transceivers have the capability to listen to the sub-channels and measure the interference receiver from other transceivers on each radio sub-band. It is further assumed that the radio sub-channels are shared between the transceivers and if the two transceivers choose the same radio sub-channel it will have some impact on both depending on the radio channel between them.

We assume that N transceivers form a cluster of transceivers (see FIG. 10). It is assumed that overall available spectrum has been divided into P sub channels and each transceiver might transmit at each time in M sub-channels so that M<P.

We assume that the interactions between the involved transceivers can be characterised by the following interference function:

$$\omega(i,j,S_m)=1 \text{ if transceivers } i \text{ and } j \text{ are both transmitting} \\ \text{over the } m\text{-th subchannel } S_m \text{ else } \omega(i,j,S_m)=0 \quad (1)$$

The interference from transceiver i on the BS j at radio sub-channel $S_m$ is assumed to be:

$$I_{ijm}=p_i\eta_{ji}\omega(j,i,S_m) \text{ where } m=1\ldots M \quad (2)$$

where M is the number of radio sub-channels, $p_i$ is the transmission power associated with transceiver i and $\eta_{ij}$ is the overall transmission gain associated with the link from the transceiver i and transceiver j. In a similar way the interference from between transceiver i and transceiver j is expressed as $$I_{jim}=p_j\eta_{ij}\omega(j,i,S_m) \text{ where } m=1\ldots M \quad (3)$$

The overall interference $\gamma_i$ received from all the other transceivers can be determined as $$\gamma_i = \sum_{j=1, j \neq i}^{N} \sum_{m=1}^{m} I_{jim} \quad (4)$$

The overall interference $\beta_i$ inflicted by BSi on the other base stations can be determined as $$\beta_i = \sum_{j=1, i \neq j}^{N} \sum_{m=1}^{M} I_{ijm} \qquad (5)$$

The total interference inflicted on all the transceivers within a cluster can be expressed as $$\theta = \sum_{i=1, i \neq j}^{N} \sum_{j=1, i \neq j}^{N} \sum_{m=1}^{M} I_{ijm} \qquad (6)$$

We assume that the total traffic load handled by a transceiver is:

$$\alpha_i = \sum_{k=1}^{K} d_{ki} \qquad (7)$$

where $d_{ki}$ is the amount of data currently residing in the k th buffer of the i th base station.

The individual steps of a method embodying the present invention will be now be described, referring to FIGS. 12 to 29.

Figure 12:
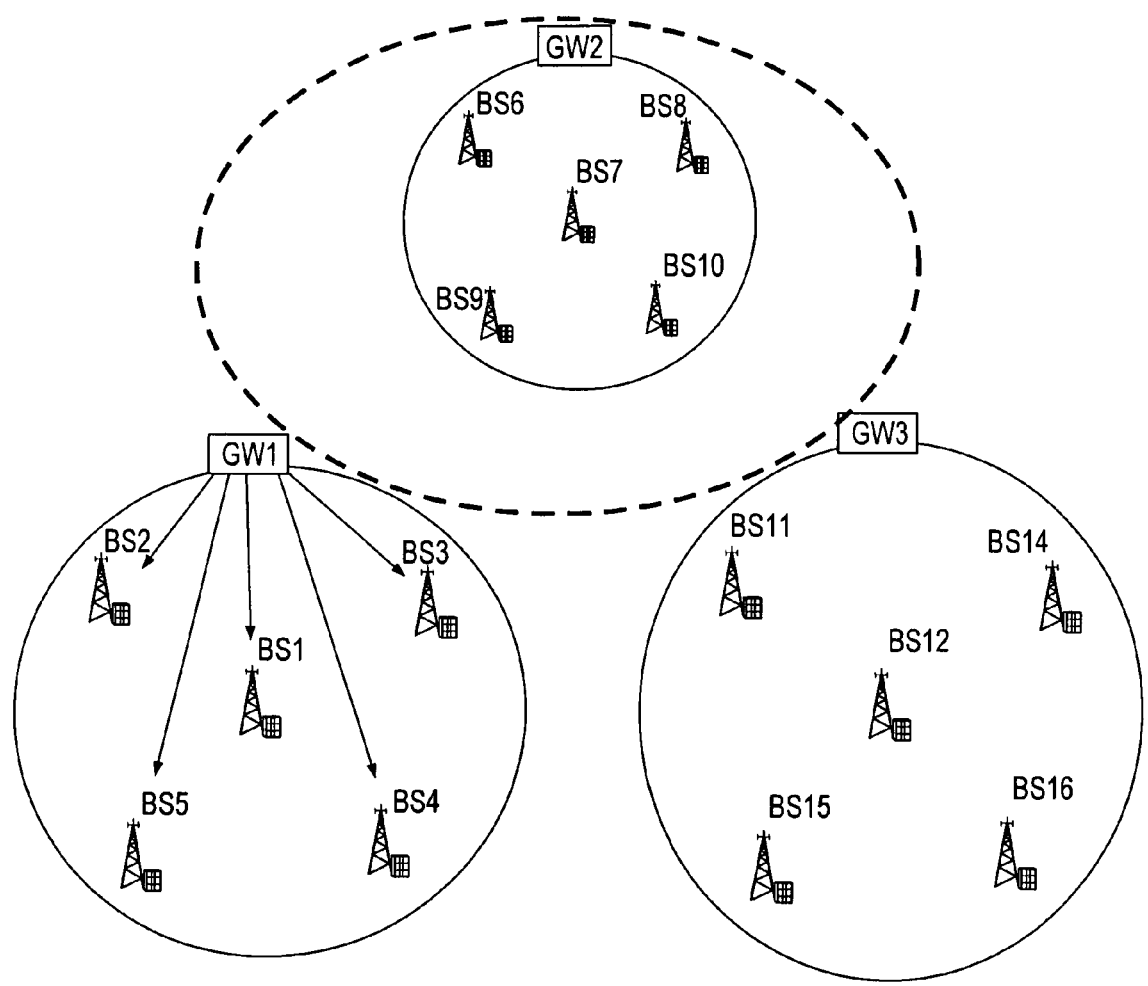
FIGS. 12 to 14 illustrate successive steps in a method embodying of the present invention.

FIG. 12, along with corresponding later Figures, conceptually shows three co-existing RANs having respective GWs GW1, GW2 and GW3. The RANs are shown in a separate but proximate bordering relationship with each other, but this is purely figurative. The RANs may overlap partly or completely in their geographical regions Step 1: The gateway of one particular RAN, for example GW1 in FIG. 12, determines the current level of total interference $\theta$ inflicted on BSs in its RAN based on current interference level and link gains. If the total interference is above a critical threshold, the GW1 declares itself "red" or interference critical. GW1 may be partially in an interference-critical state, for example in neighbouring regions to GW2 and GW3.

Step 2: As shown in FIG. 12, the gateway GW1 asks its assigned BSs to report their own interference measurement (or an indication of total interference in each BS) on them. In addition, if it has not already done so GW1 calculates an estimate of total interference arising within the RAN, along the lines given in the above theoretical discussion.

Figure 13:
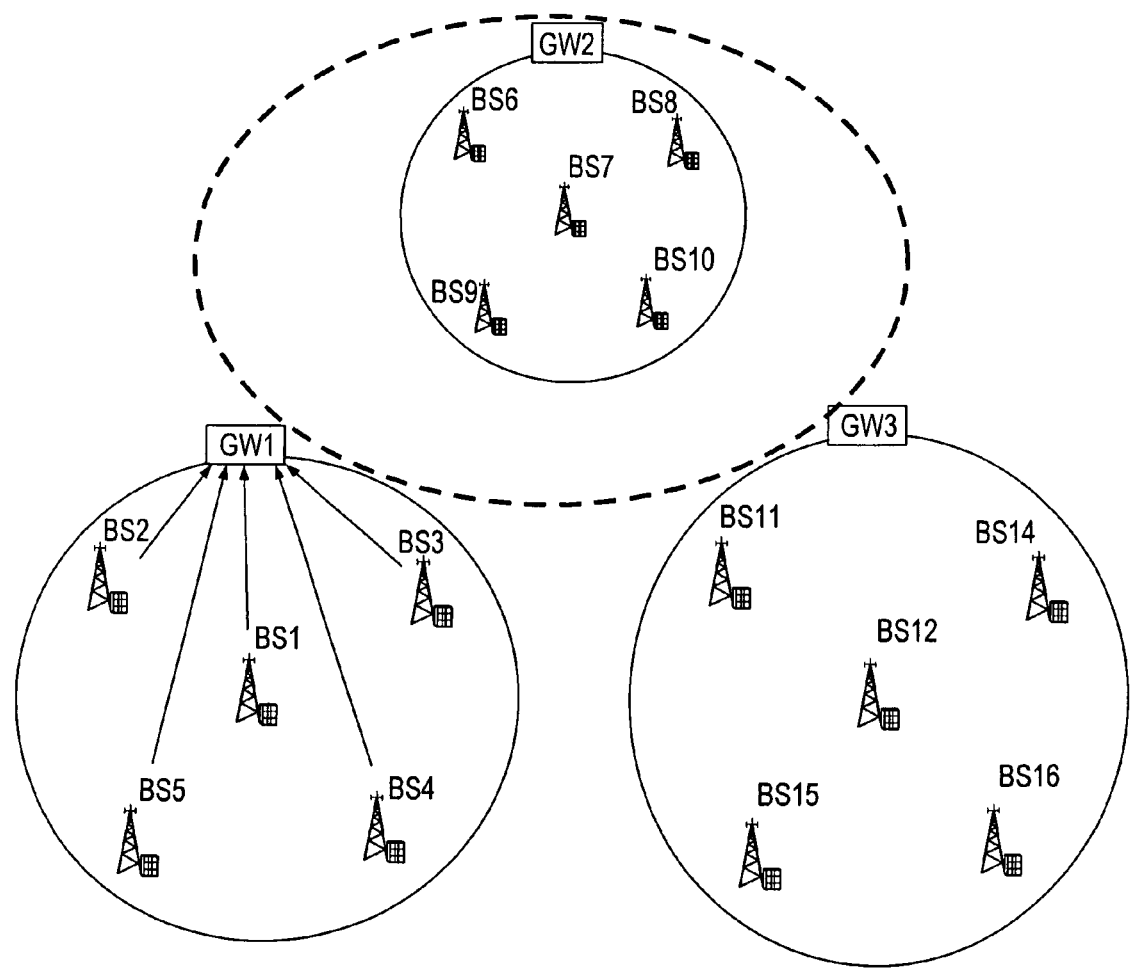

Step 3: The BSs provide this information to the GW1 as shown in FIG. 13. In the Figure, the BSs are shown individually providing this information to their GW; alternatively, it would be possible for specific BSs (such as a "Primary" base station illustrated in FIG. 10) to respond on behalf of the other BSs.

Step 4: (a) The GW (GW1 in FIG. 13) compares the estimated total interference to the sum of all the interferences measured and reported by its associated BSs. (b) If the difference is not significant, the GW assumes that the red situation is caused by a non-optimal centralised dynamic channel allocation attempt; in other words, that the interference is arising internally within its own RAN as a result of the current sub-channel assignment among the associated BSs. The GW performs further trials of the centralized dynamic channel allocation process. Thus, it attempts to solve the interference-critical state by itself.

Figure 14:
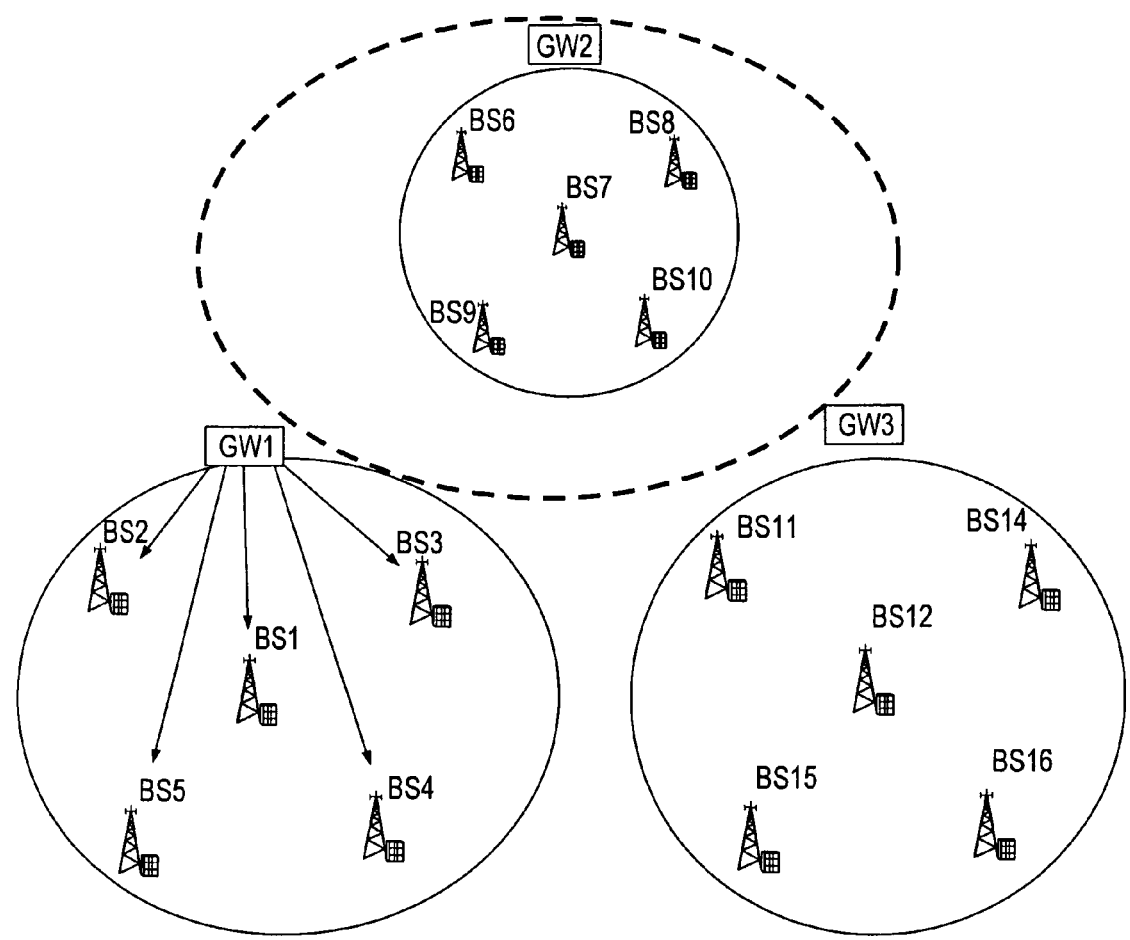

Step 5: If the difference is high and above a pre-assigned threshold, the GW concludes that the problem is coming from the co-existing RANs currently sharing the spectrum with GW1. In that case, GW 1 asks its assigned BSs to report the consistently troubled sub-channels as shown in FIG. 14.

Figure 15:
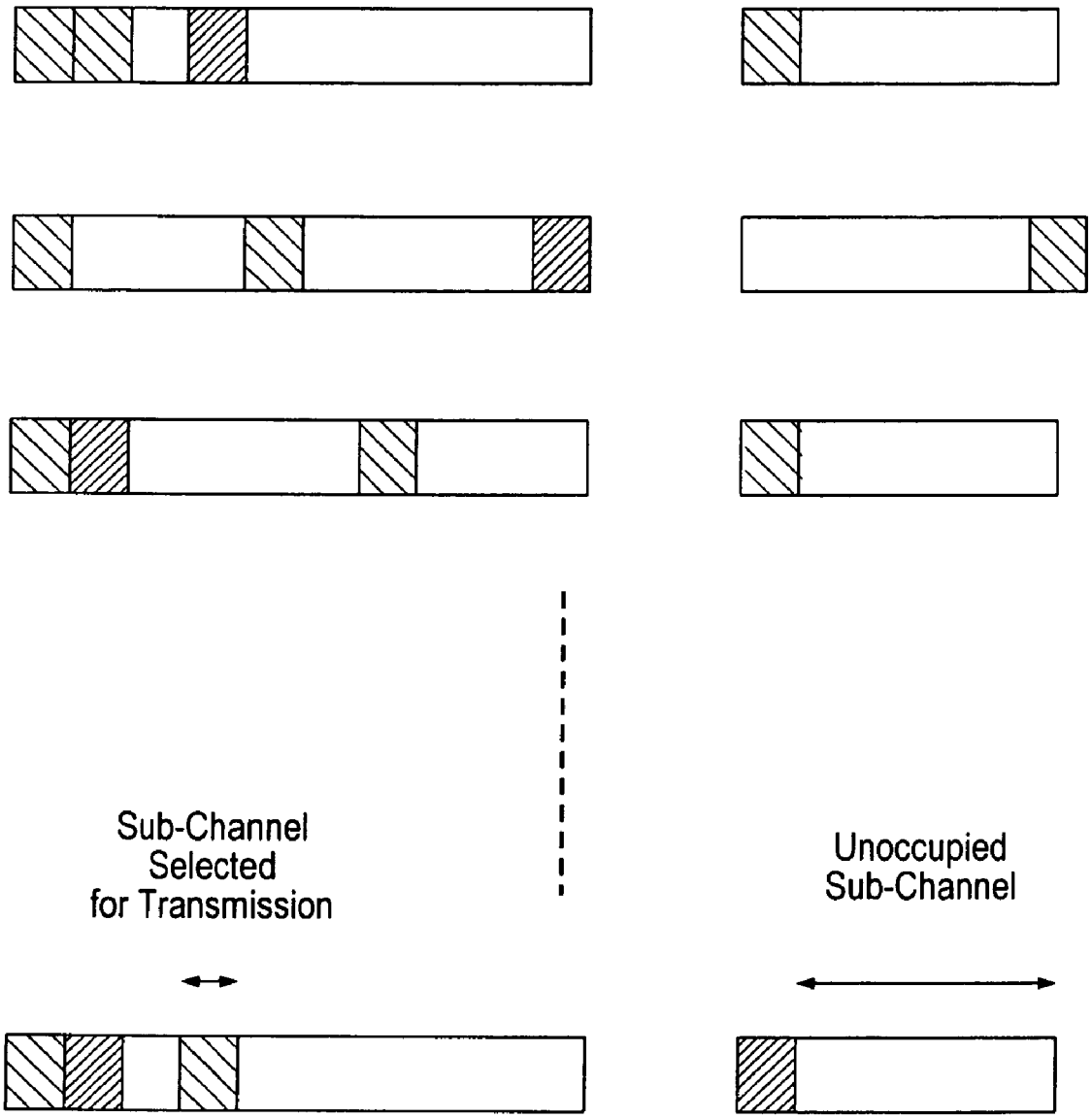
FIG. 15 is for explaining troubled or "red" sub-channels in a RAN.

FIG. 15 shows a set of rows each representing the interference experienced at a respective BS. The horizontal direction in FIG. 15 can be regarded as a frequency axis, and subdivisions of each row are individual subchannels. Note that there is no need for these to be contiguous, as indicated by the gap in each row. The troubled sub-channels as shown in FIG. 15 are the radio sub-channels which have suffered most from a consistently high amount of interference for, e.g. the past n transmission periods. In the example shown, lightly-shaded sub-channels are ones suffering some interference and darker-shaded sub-channels are experiencing high interference ("red").

Figure 16:
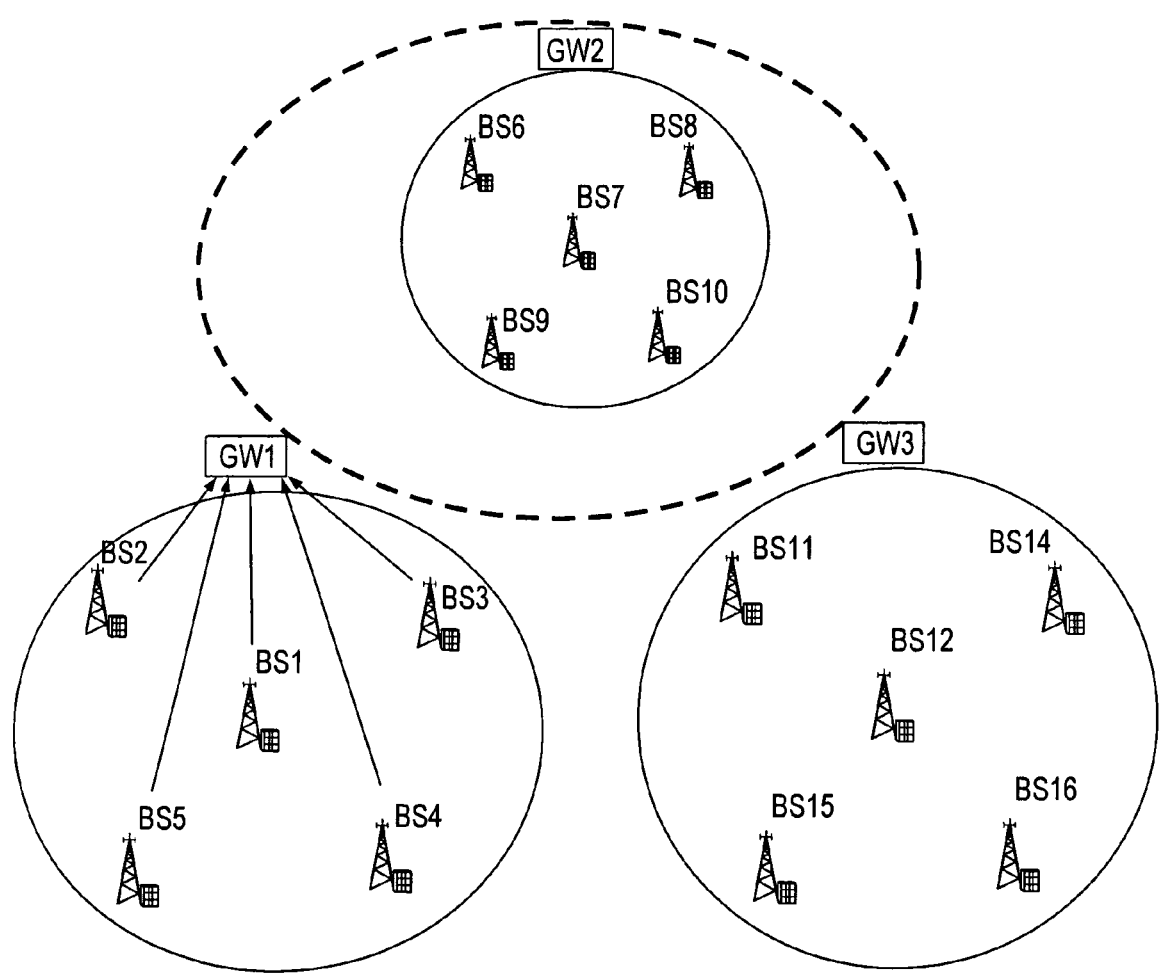
FIG. 16 illustrates another step of the method embodying of the present invention.

Step 6: The BSs provide the requested information to the GW as shown in FIG. 16.

Figure 17:
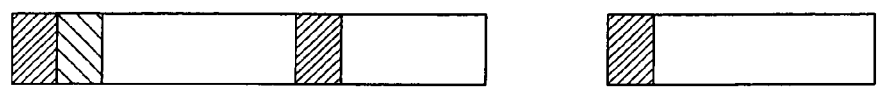
FIG. 17 illustrates a step of forming a list of troubled sub-channels.

Step 7: Based on the received list of troubled sub-channels, GW 1 constructs a unified list of troubled sub-channels as shown in FIG. 17. In other words, individual BS reports of the form shown in FIG. 15 are combined into a single list.

Figure 18:
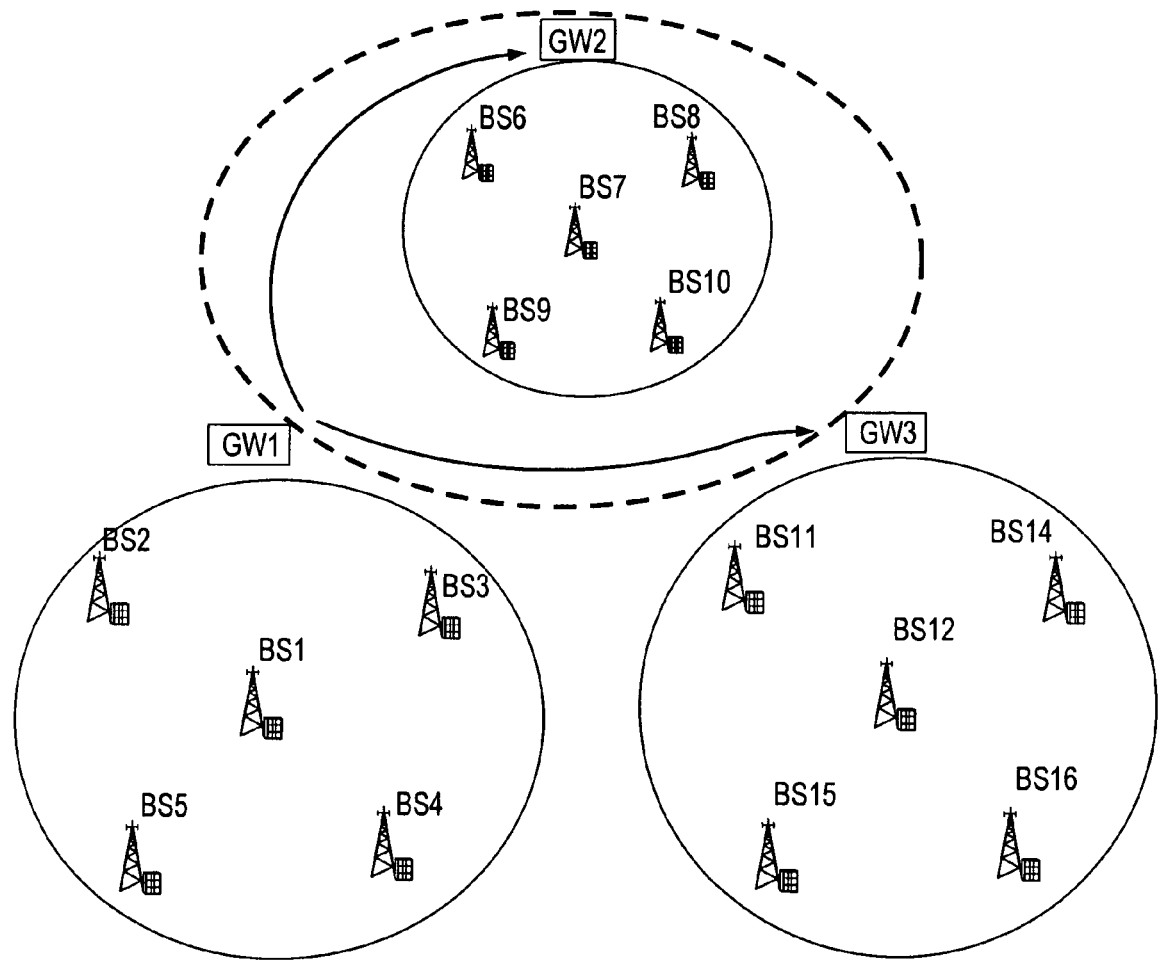
FIGS. 18 to 21 illustrate further steps in the method embodying of the present invention.

Step 7: The troubled GW 1 informs other GWs involved in the LT spectrum assignment process that it is in trouble (i.e. red) and is suffering from their interference as shown in FIG. 18. To do this, GW1 preferably uses the same signalling network as employed during LT spectrum assignment negotiations with the other GWs, such as the IP network indicated in FIG. 1.

Figure 19:
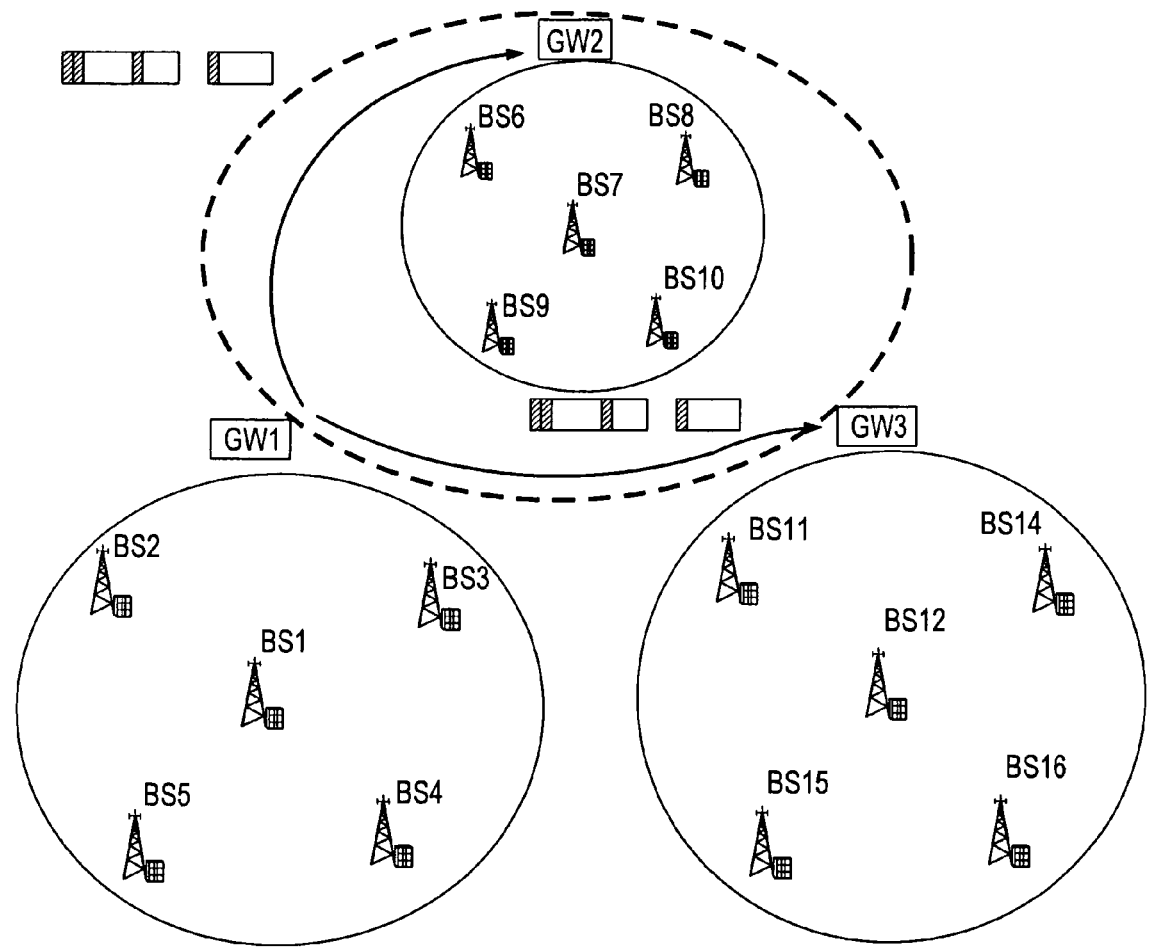

Step 8: GW 1 then provides the final list of troubled sub-channels to the other GWs involved in the ST and LT spectrum assignment and sharing process, as shown in FIG. 19. Steps 7 and 8 may be combined into a single operation.

Step 9: Those other GWs (for example GW2 and GW3) perform a new dynamic centralized channel allocation process for their respective associated BSs, thereby achieving interference cancellation based on the knowledge of the troubled channels in the suffering GW.

Step 10: The other GWs (for example GW2 and GW3) process Gateway Requests for current transmission power, current buffer occupancy and current $\eta_{ij}$, where $\eta_{ij}$ is the overall transmission gain associated with the link from the transceiver i and transceiver j. This latter information may be already available in the Gateway.

Step 11: The BSs provide the requested information to their Gateway as shown in FIG. 15.

Step 12: For each of their BSs, the other GWs (for example GW2 and GW3) map the total traffic $\alpha_i$ requiring transmission (in the next transmission period, e.g. frame) to a minimum number of required sub-channels M.

Step 13: The other GWs (GW2 and GW3) consider the potential channel allocation of a number of sub-channels for each BS.

Step 14: Then the other GWs (GW2 and GW3) consider all the possible combinations of sub-channel allocations to the BSs (e.g. on a random basis) avoiding all the red sub-channels in the list provided by the troubled GW.

Figure 20:
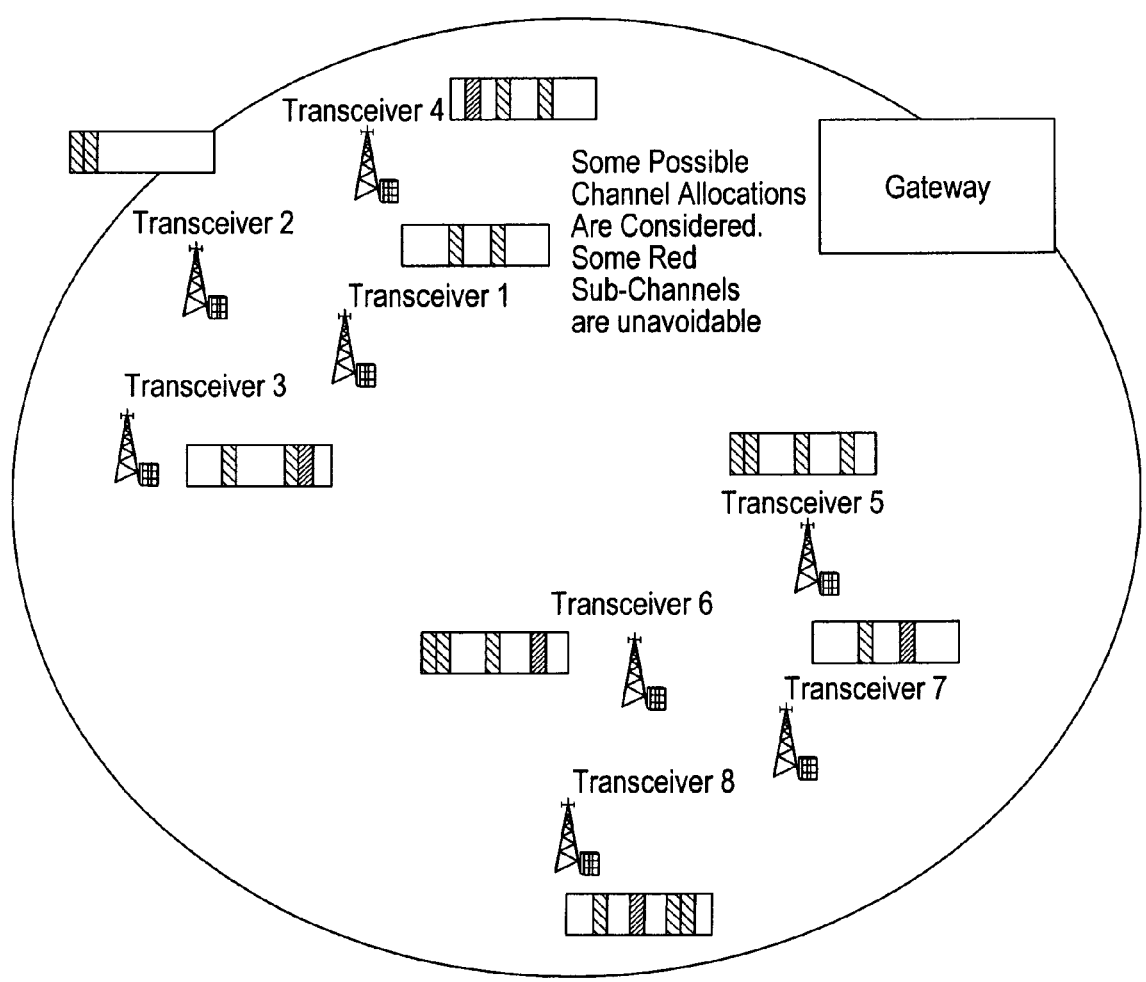

Step 15: If it is not possible to avoid red sub-channels completely, then the other GWs (for example GW2 and GW3) consider all the combinations of sub-channel allocations to BSs with a minimum number of red sub-channels involved, as shown in FIG. 20.

Step 16: Then the other GWs (for example GW2 and GW3) consider the total interference inflicted on all the BSs assigned to them, and select the combination that minimizes $\theta$ with a minimum number of red sub-channels and minimum interference on red sub-channels.

Figure 21:
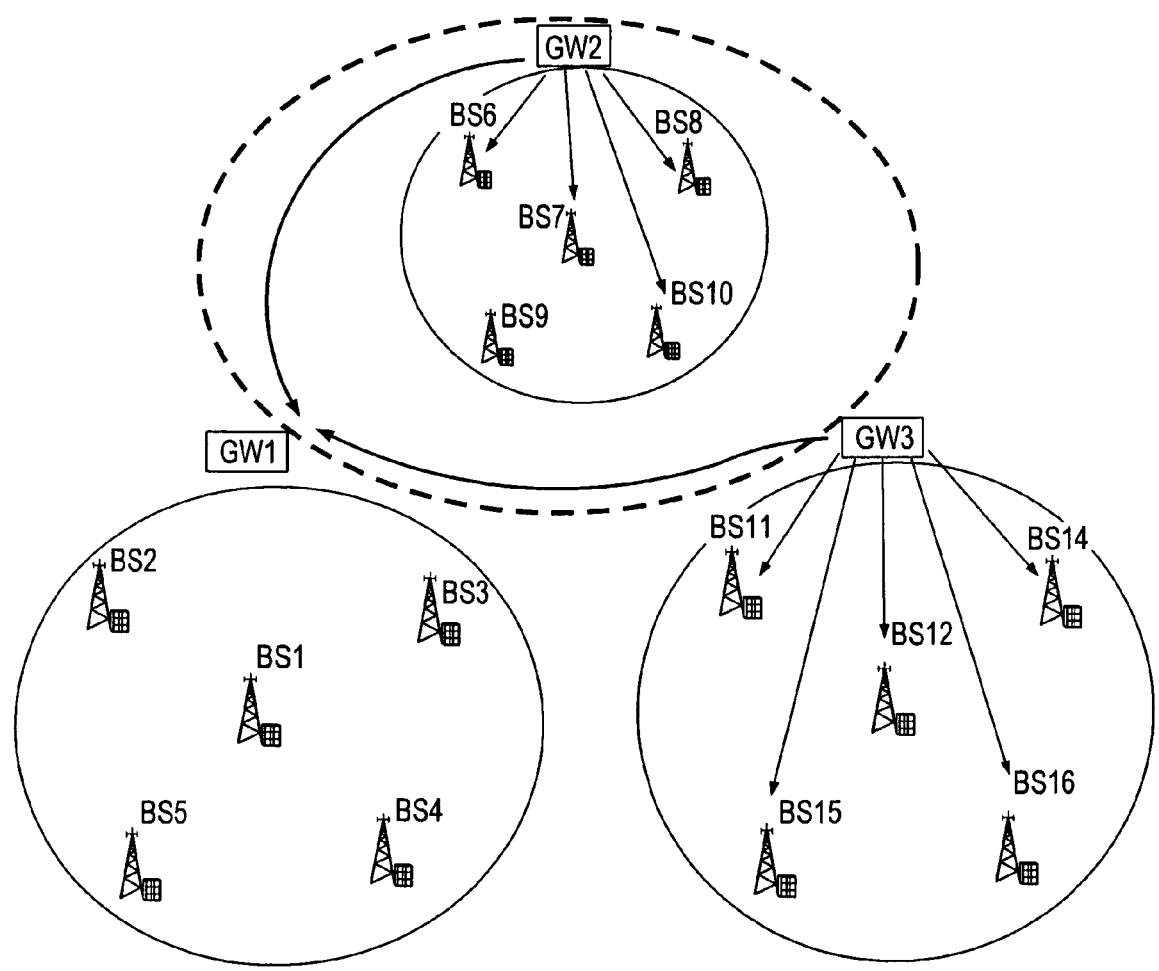

Step 17: The other GWs (for example GW2 and GW3) inform their own BS of their preferred sub-channel allocation and the troubled GW1 of the completion of the process as shown in FIG. 21. At this stage the troubled GW (for example GW1) is no longer suffering interference inflicted from outside its own RAN, or at least has less interference.

Step 18: GW1 monitors the situation to see whether or not it is still in an interference-critical state. If it is, it repeats the process from the beginning of FIG. 22A, perhaps after a time delay.

Figure 22A:
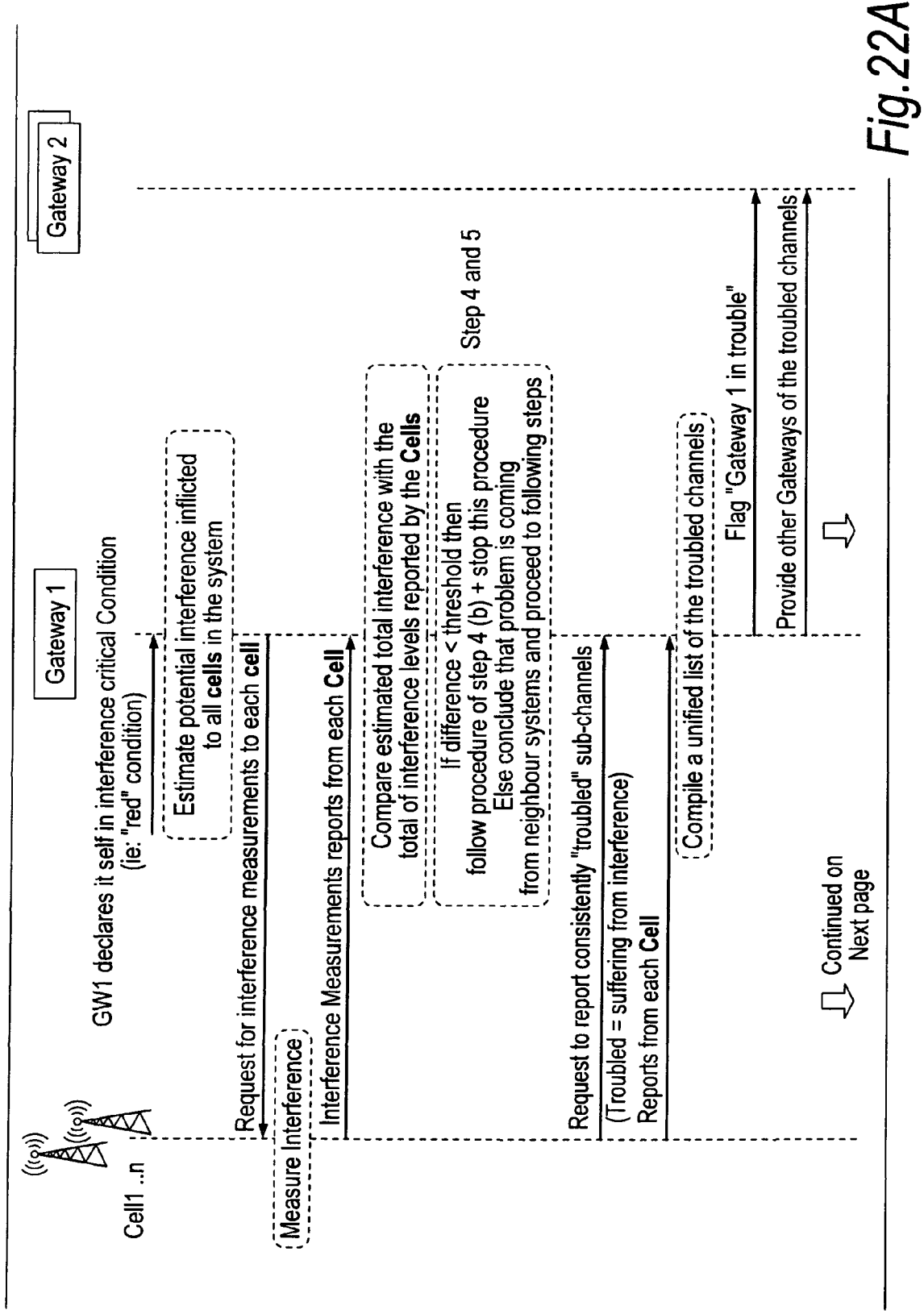
FIGS. 22A and 22B are a flowchart of the method embodying the present invention.
Figure 22B:
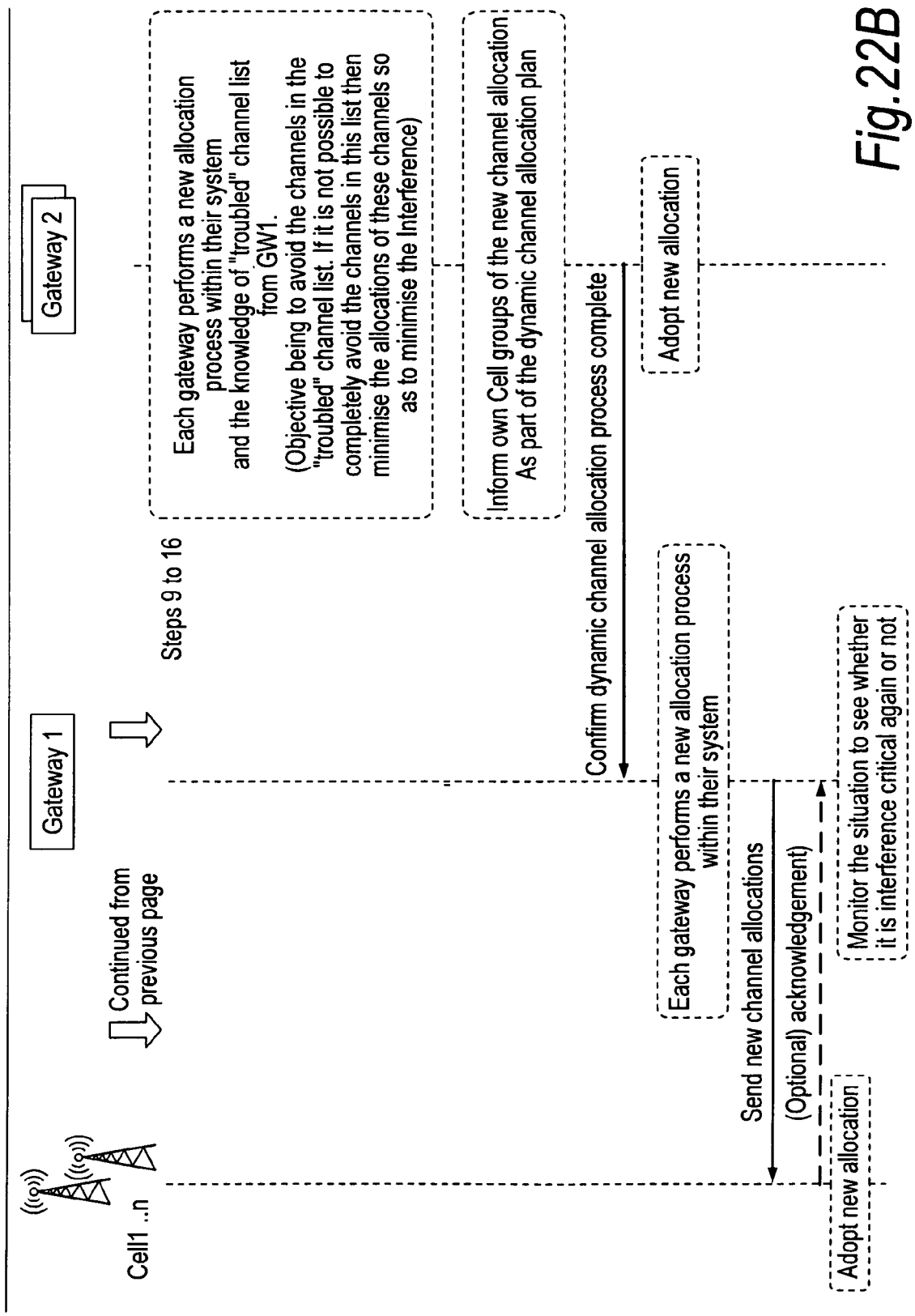

To explain the timing of the above steps of the method, FIGS. 22A and B depict the event-triggered process leading to the start of the coordination between the GWs. In these Figures, the left-hand vertical line is a time line of actions at the BS level; the centre vertical line shows the sequence of operations in the troubled GW; and the right-hand vertical line shows actions performed in the other gateways.

Figure 23A:
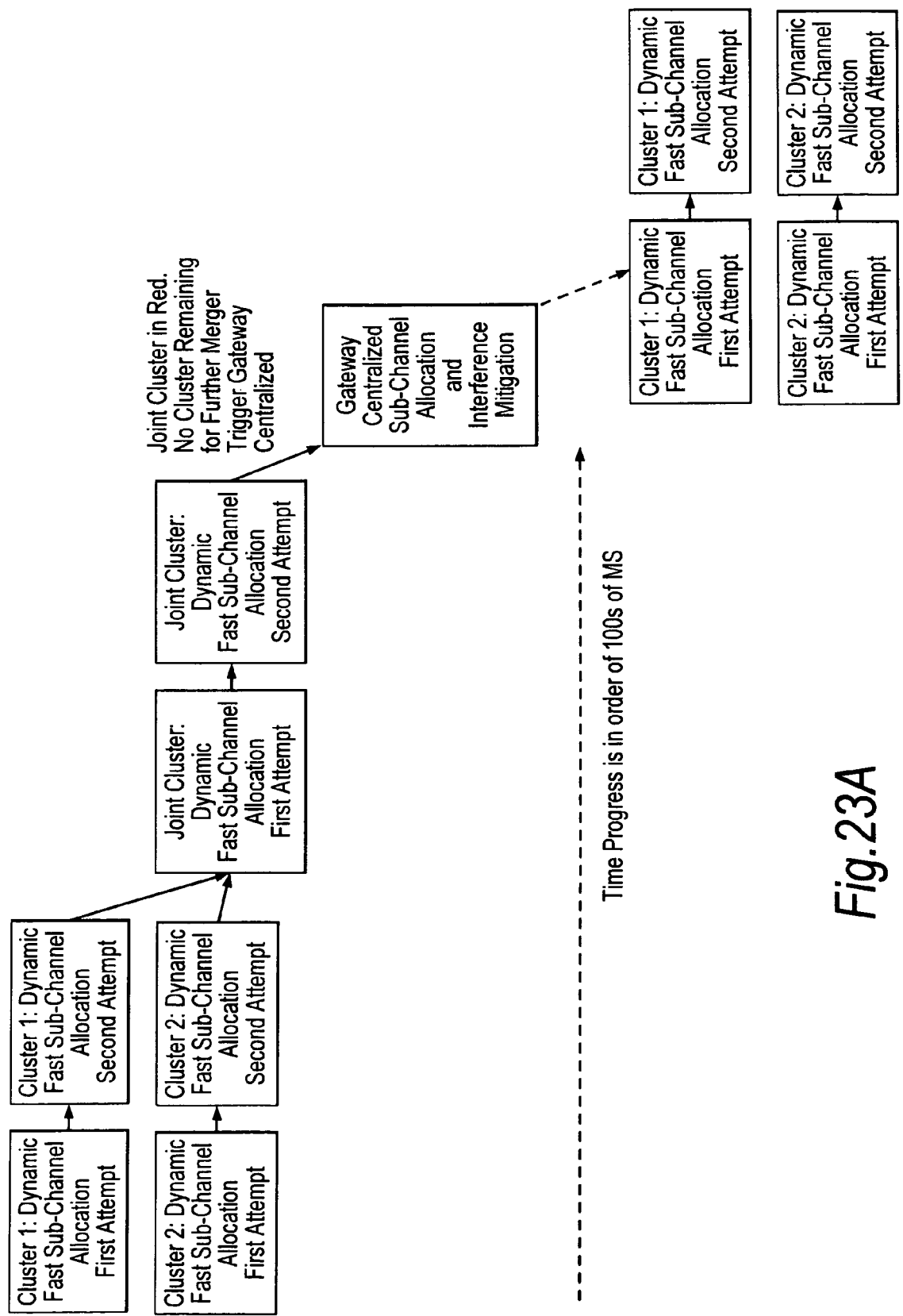
FIGS. 23A and 23B are a timing diagram illustrating when to apply the method embodying the present invention.
Figure 23B:
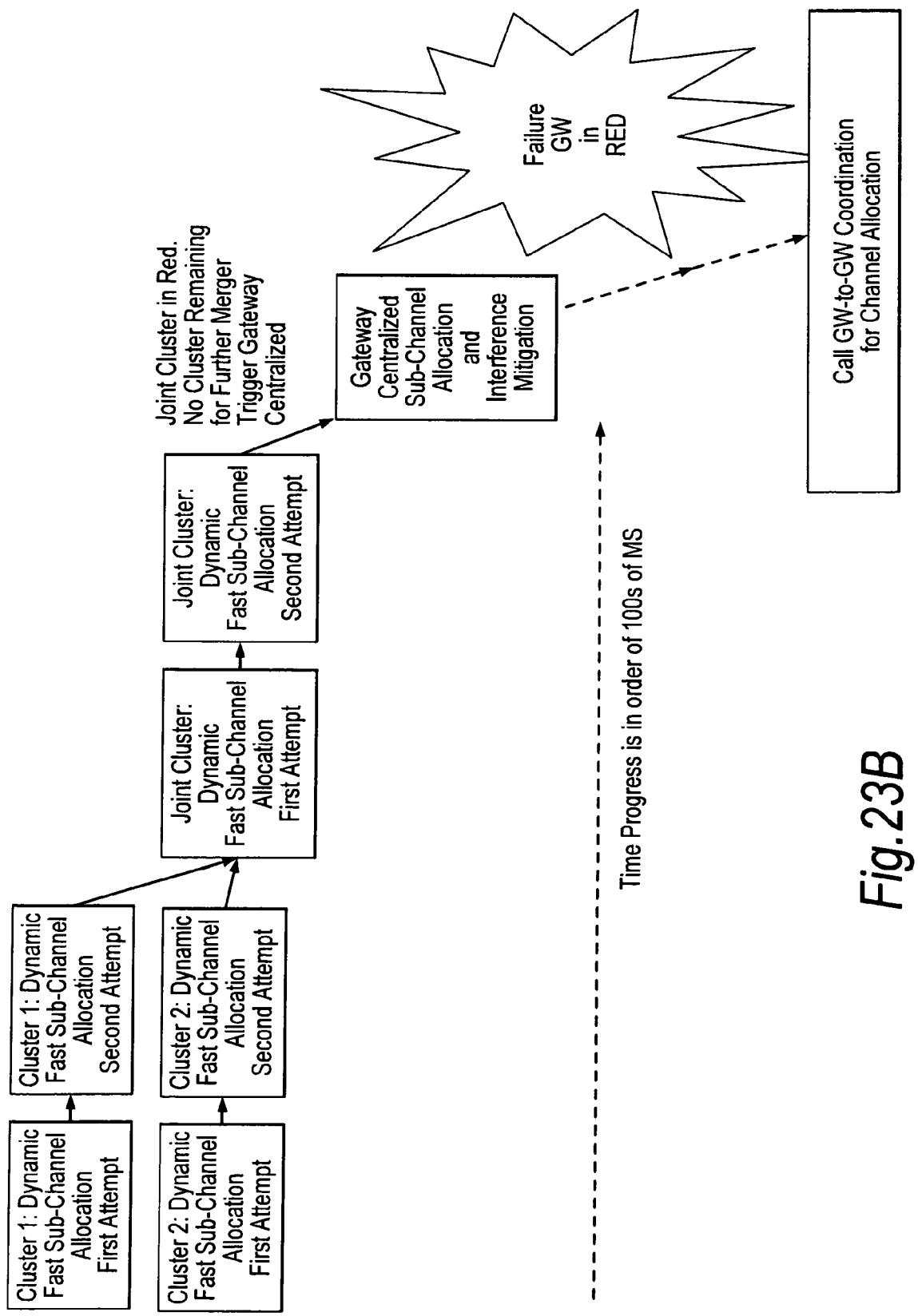

FIGS. 23A and 23B summarise events which can trigger use of the method embodying the present invention. FIG. 23A shows dynamic allocation on an ms timescale using clusters, the details of which are the subject of a co-pending patent application. As shown in FIG. 23B, if the results of this dynamic allocation fail to resolve the red condition of the clusters, this indicates that interference cannot be sufficiently mitigated at the RAN level, and thus the GW-to-GW coordination according to the present invention is triggered.

Figure 24:
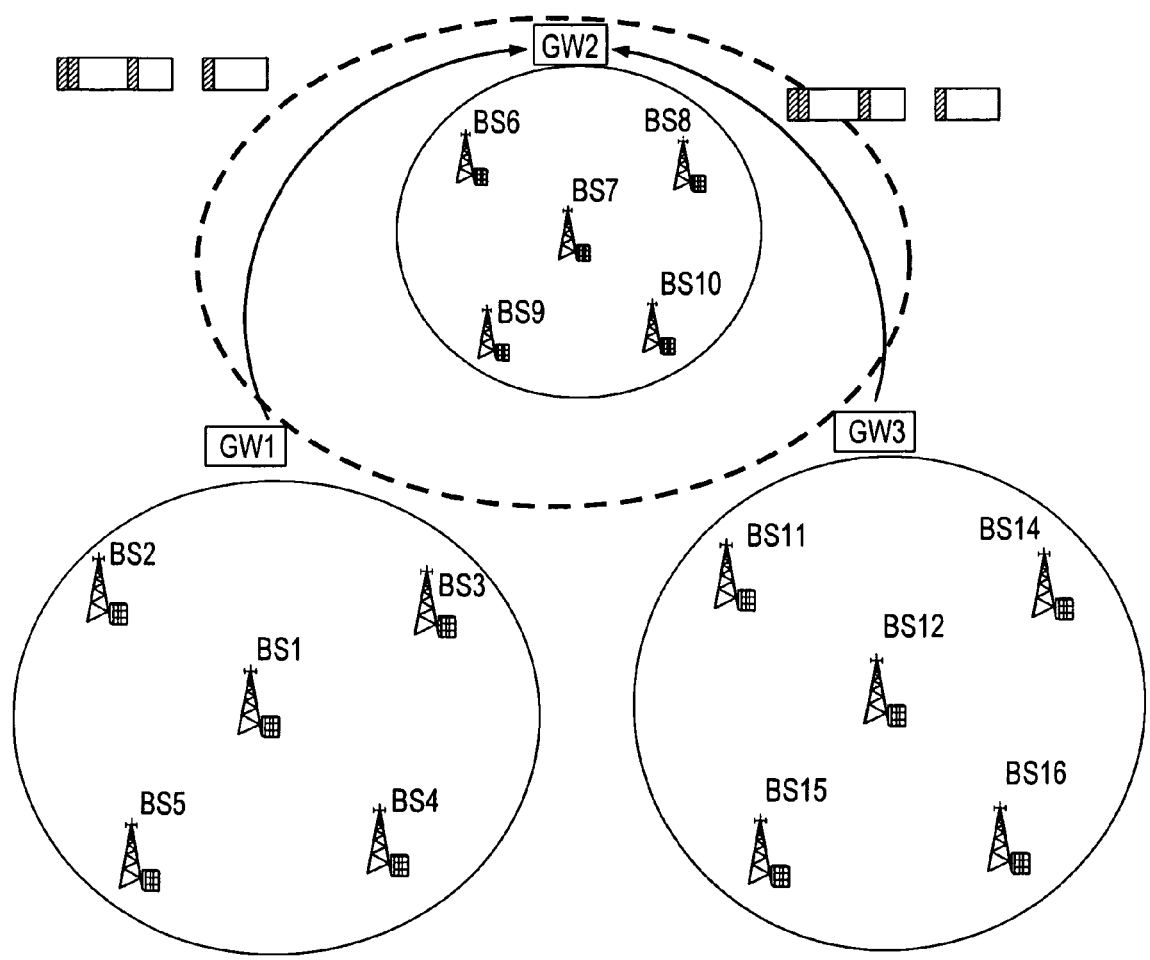
FIGS. 24 illustrates a still further step of the method embodying of the present invention.

When more than one GW is in an interference state, so that there is more than one troubled list being notified in the system, the GW that receives the multiple troubled sub-channel lists creates a new list by combining the received lists as shown in FIG. 24. In this example, GW1 and GW3 both send information on their troubled sub-channels to GW2 which collates the data into a single combined list.

Figure 25:
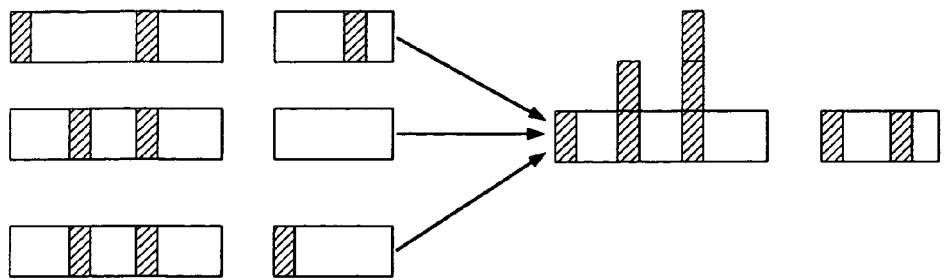
FIG. 25 illustrates a step of compiling a list of troubled sub-channels for multiple GWs.

The combined list the provides a prioritised list of troubled sub-channels as shown in FIG. 25. It helps the GW of interest (GW 2 in FIG. 24), to identify the most troubled (i.e. over-lapped sub-channels) and give them a lower priority when it is about to perform the future dynamic channel allocation with its own BSs.

Figure 26:
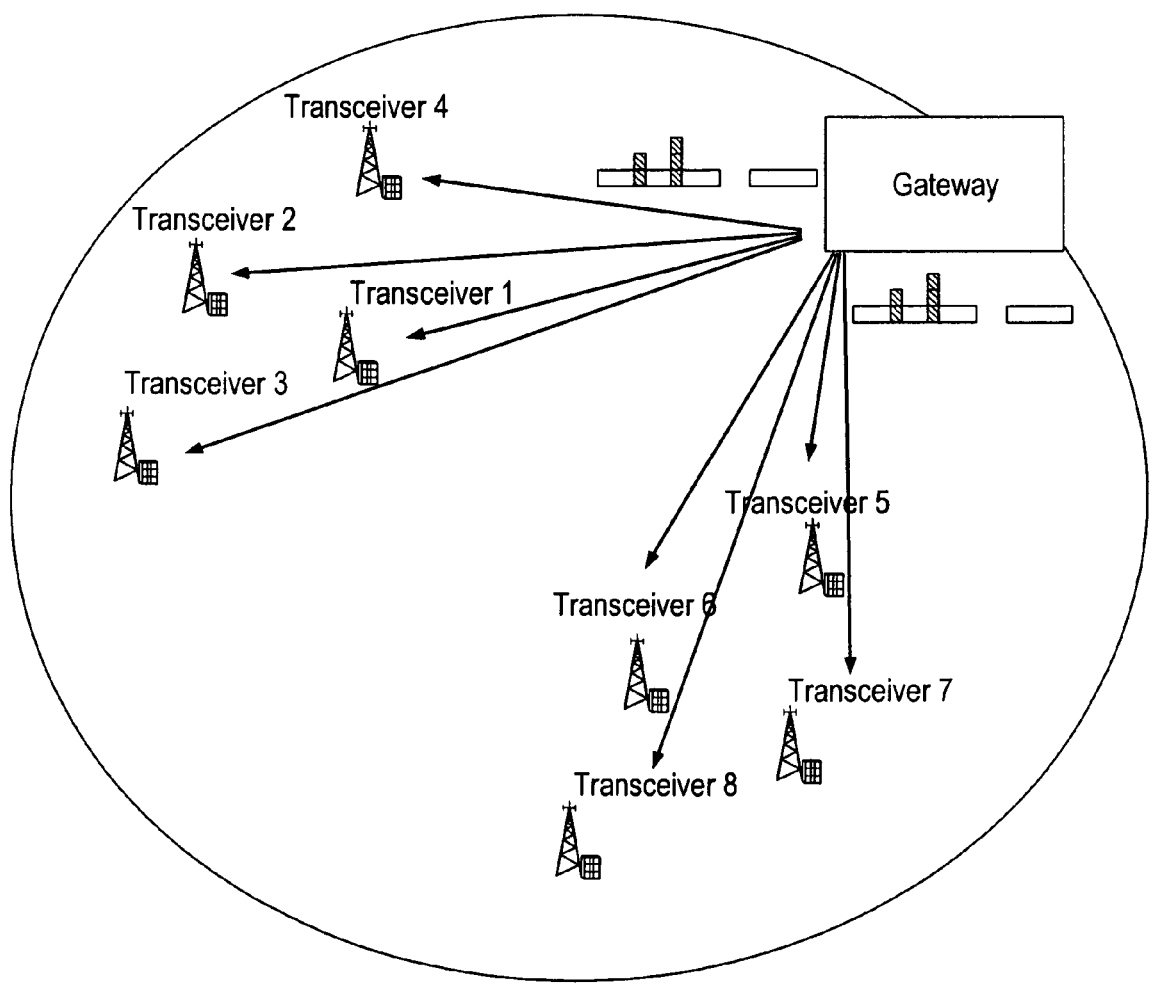
FIGS. 26 to 29 illustrate more steps and possible modifications in the method embodying the present invention.

Subsequently this GW can take any of the following further courses of action:

A. The GW can transmit the list of most-frequently troubled channels (or all troubled channels, perhaps depending on how many are affected) to the BSs who are going to be engaged in the process of dynamic channel allocation or short term spectrum assignment as shown in FIG. 26.

This ultimately means two courses of action for the BSs associated with the GW:

(i) These BSs try to avoid these sub-channels as much as they can in the process of dynamic channel allocation.

(ii) In the Short Term Spectrum assignment process, BSs of interest will try to negotiate sub-chunks of spectrum which do not include the most troubled sub-channels.

Figure 27:
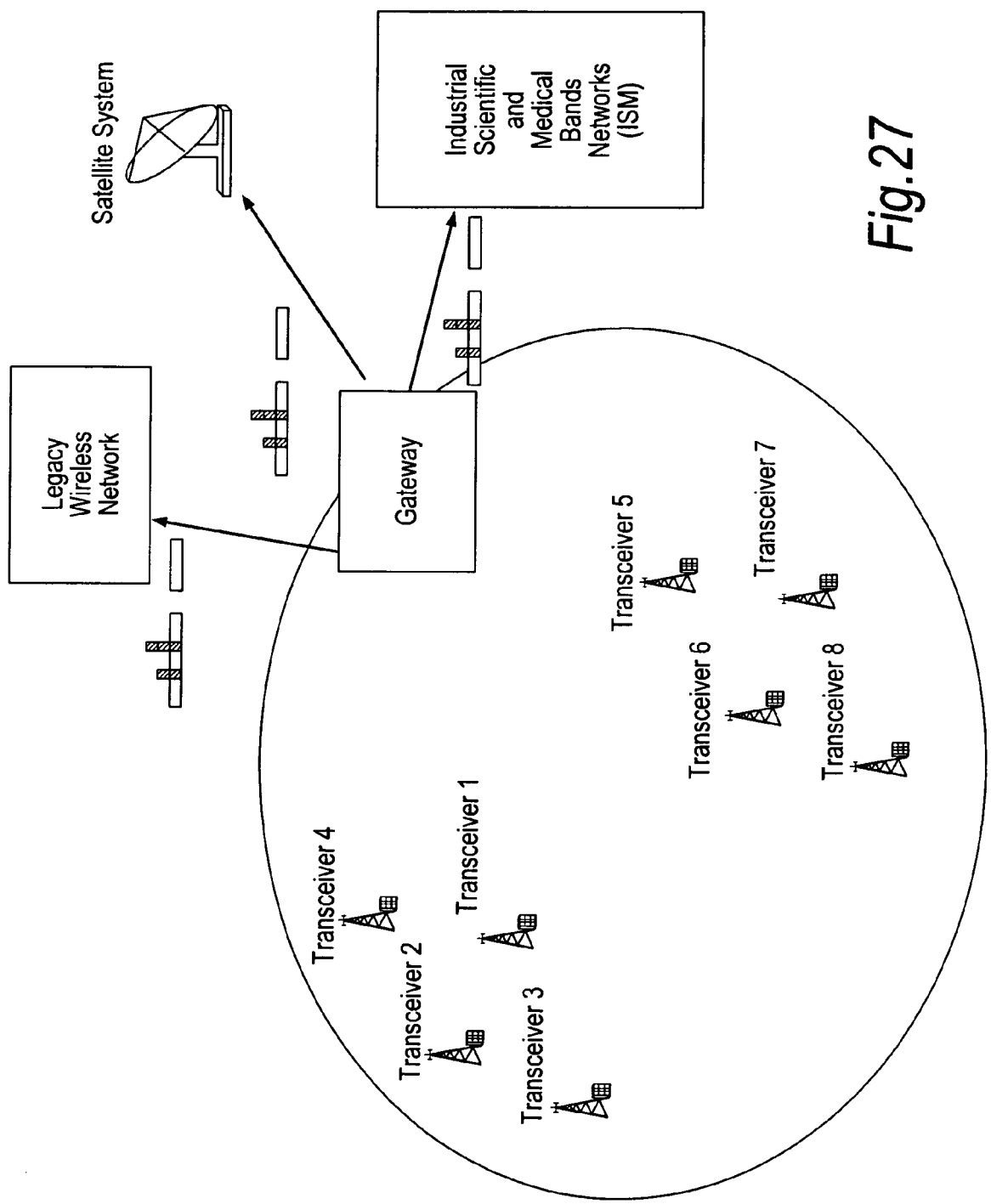
Figure 28:
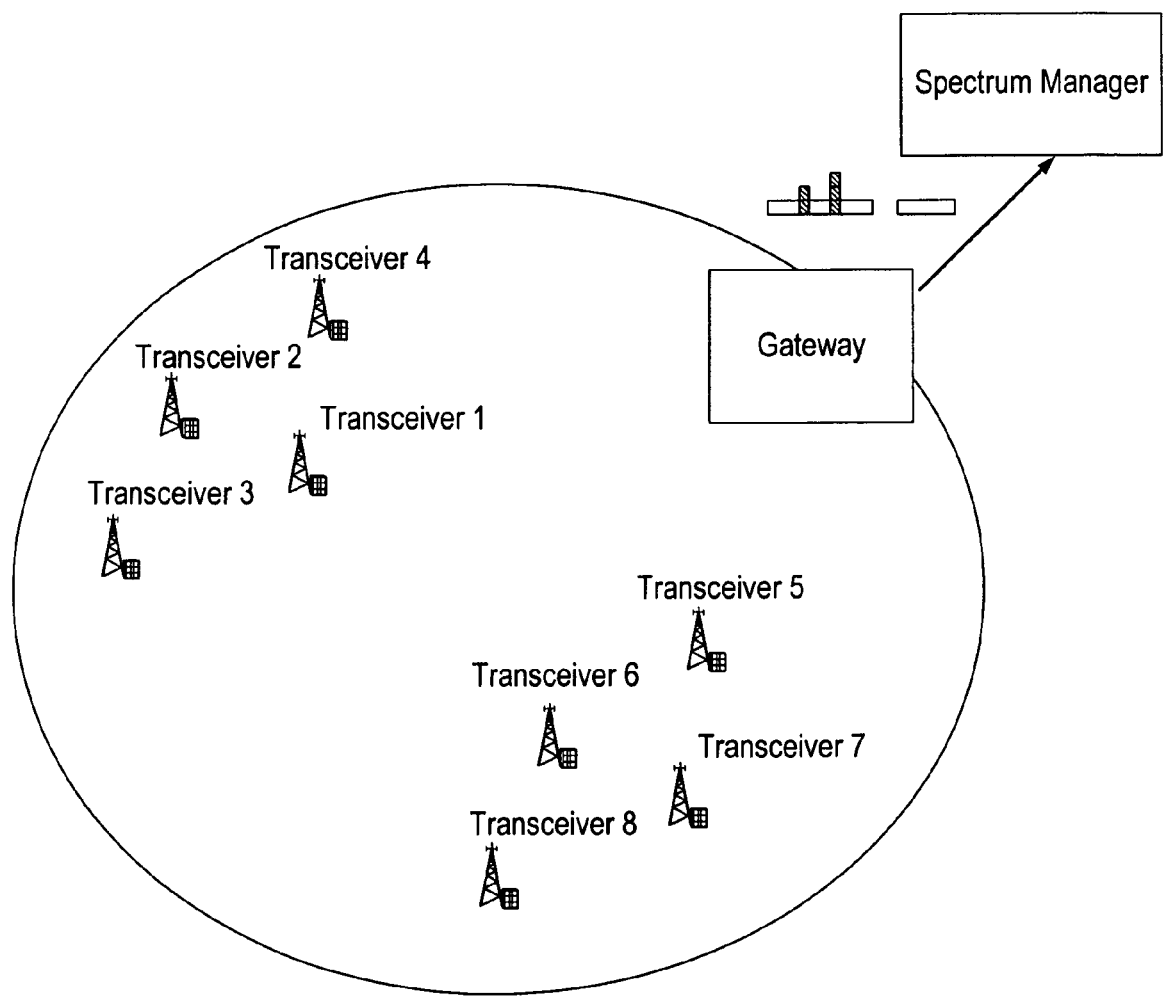

B. The GW can send the list of (most-frequently) troubled channels to all the surrounding RANs or other networks such as satellite networks that might be interested in future Long Term Spectrum assignment or negotiation, as shown in FIG. 27. In any potential future long term negotiation the GW would send the list of most troubled channels to the overall Spectrum Manager and Policy Maker (e.g. a central WINNER spectrum manager) to register and consider using long term the most-frequently troubled sub-channels as a part of a guard band, or shifting the current guard bands or forming new guard bands to avoid the pressure in those specific sub-channels as shown in the following figure.

Figure 29:
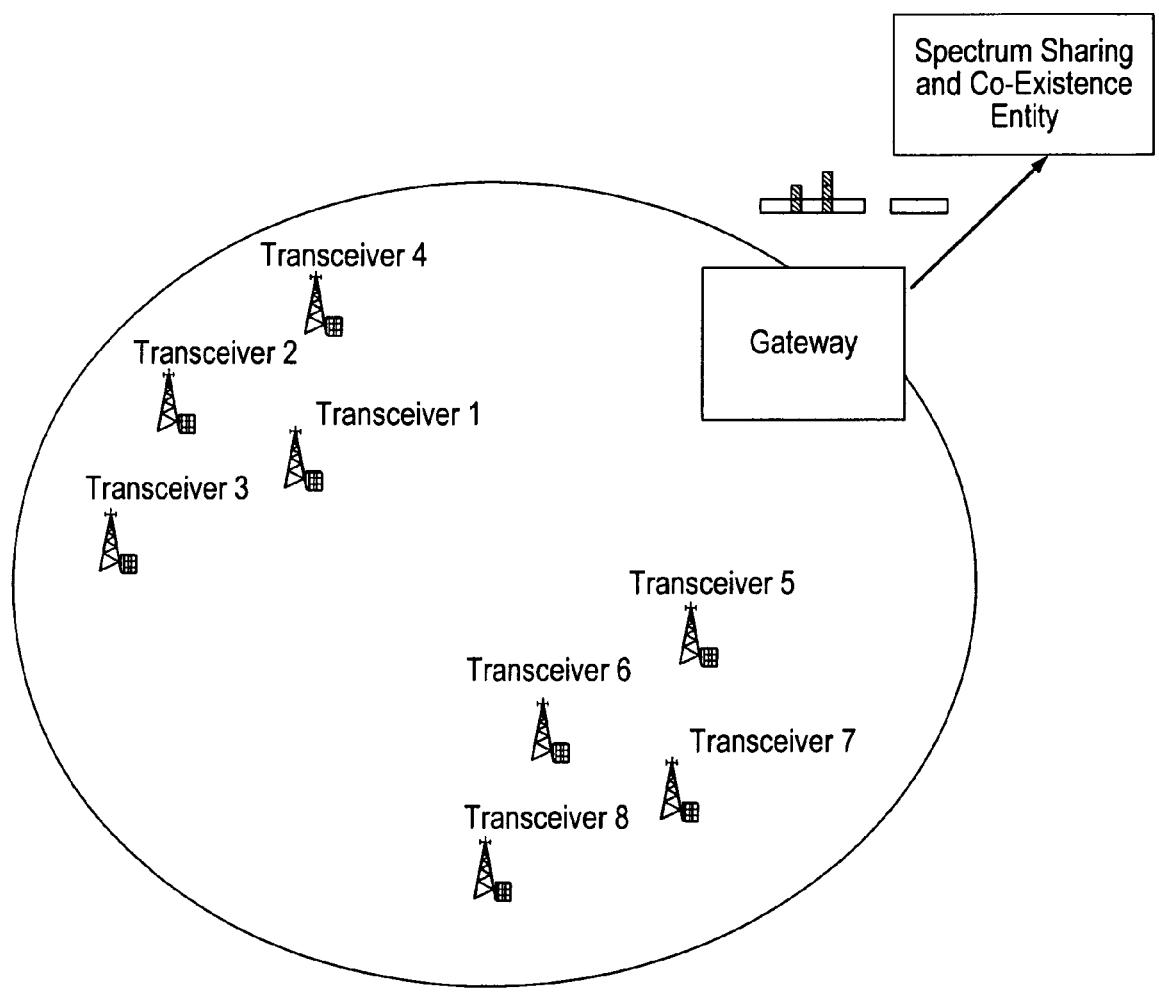

C. FIG. 29 illustrates a Spectrum Co-existence and Sharing entity, as proposed in WINNER for example. This can be an additional management level between the GW level and the Spectrum Manager, and may involve its own dedicated hardware. GW can inform the Spectrum Co-existence and Sharing entity of the list of the most troubled sub-channels, and ask it to consider them in any future potential action of spectrum sharing or definition of spectrum boundaries or guard bands in future.

Although the above description refers to base stations for convenience, the present invention is not restricted to radio access networks having distinct base stations as such. It may also be applied to networks in which the functions of base stations are handled in other equipment such as UTs, or in networks such as RFID networks and BANs as already mentioned.

Figure 30:
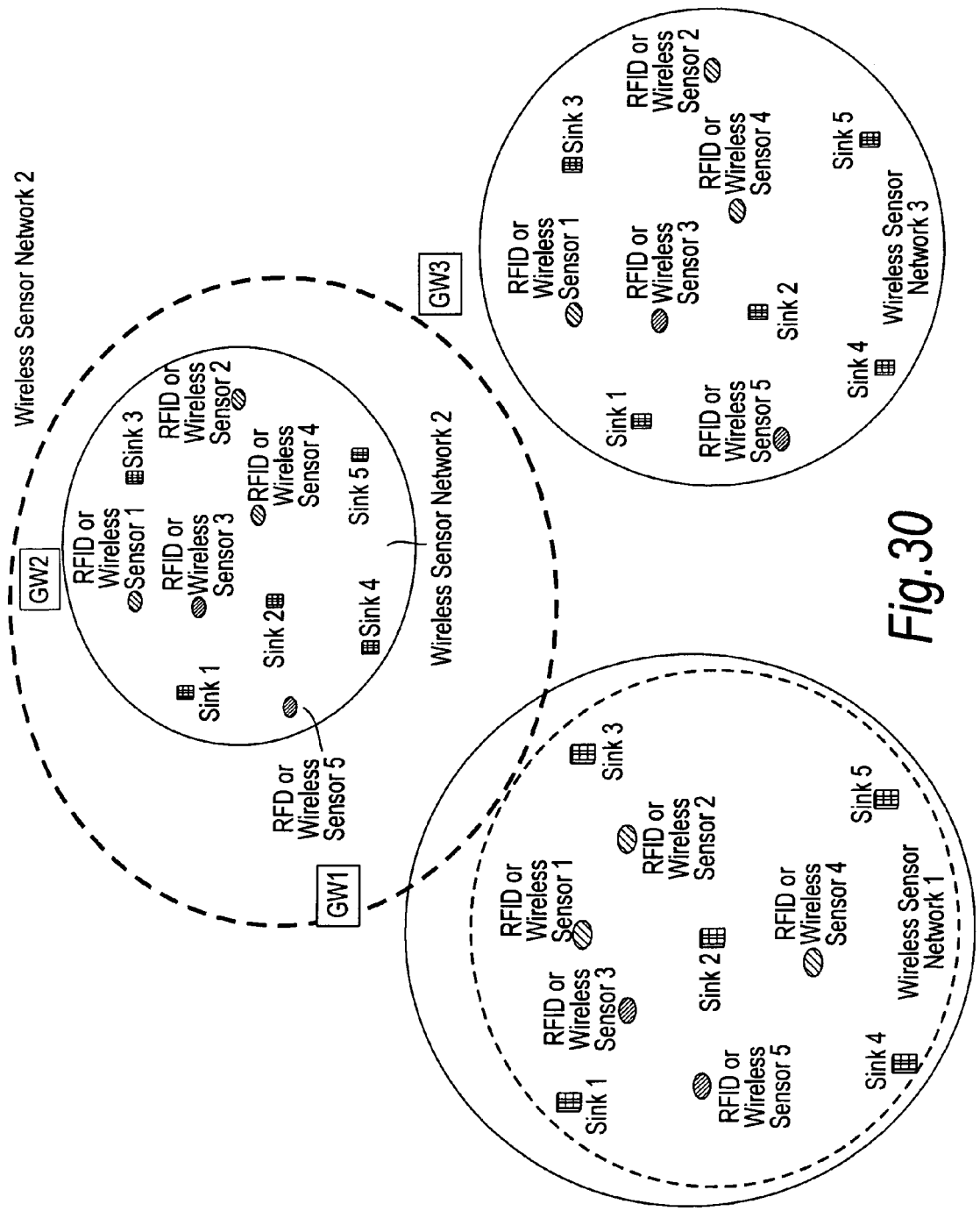
FIG. 30 illustrates a system of wireless sensor networks in a configuration corresponding to the RANs of FIG. 11.

FIG. 30 shows an example of a system of RFID or wireless sensor networks (WSNs) in a similar configuration to FIGS. 11-14, 16-19, and so on. In a similar way to the three networks shown in those Figures, each having multiple BSs served by a respective GW, FIG. 30 illustrates three RFID/sensor networks (WSN 1, 2 and 3) each comprising multiple sensors and "sinks" for the sensor data (the sinks are the equivalent of BSs in a wireless communication network). As FIG. 30 also shows, each WSN has a respective GW (GW1, GW2 or GW3) having corresponding functions to the gateways previously described and configured to carry out the above-described method in an analogous fashion.

To provide an indication of the effect of the method embodying the present invention, results of simulations will now be considered.

In the following simulations, clusters of transceivers (refer back to FIG. 10) within two RANs are considered. It assumed that two gateways are involved in the interference coordination and joint channel allocation processes described above. Total interference for two gateway and their assigned BSs has been monitored. It is assumed that 12 sub-channels are available. To make a fair comparison it is assumed that the received useful signal power is the same for all the transceivers and SIR is determined based on the assumption that they have similar received power.

Adaptive channel coding rates for a data packet and radio node have been considered to enable the radio nodes to adjust their transmission rates and consequently the target SIR values. The BER requirements selected for simulations is $10^{-3}$, and it is assumed that the use of a Reed-Muller channel code RM(1,m). The coding rate combinations and the corresponding SIR target requirements used for the simulations are related as shown in Table 1.

TABLE 1

Code Rates of Reed-Muller Code RM (1, m) and Corresponding SIR Requirements for Target BER

| m | Code Rate | SIR (dB) |
|---|---|---|
| 2 | 0.75 | 6 |
| 3 | 0.5 | 5.15 |
| 4 | 0.3125 | 4.6 |
| 5 | 0.1875 | 4.1 |
| 6 | 0.1094 | 3.75 |
| 7 | 0.0625 | 3.45 |
| 8 | 0.0352 | 3.2 |
| 9 | 0.0195 | 3.1 |
| 10 | 0.0107 | 2.8 |

Figure 31A:
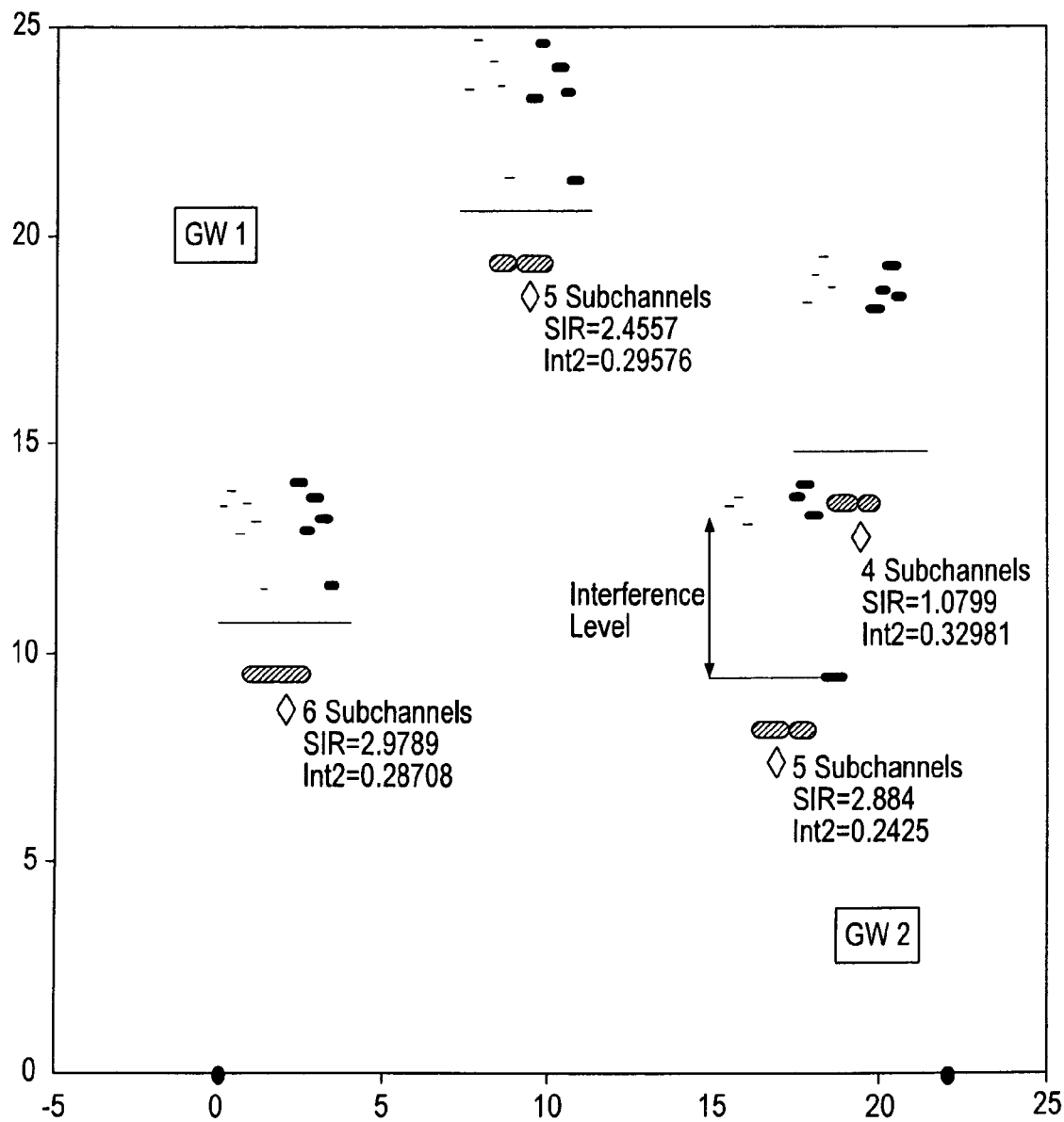
FIGS. 31A and 31B, and FIGS. 32A and 32B, illustrate results of simulations to evaluate the performance of the method embodying the present invention.
Figure 31B:
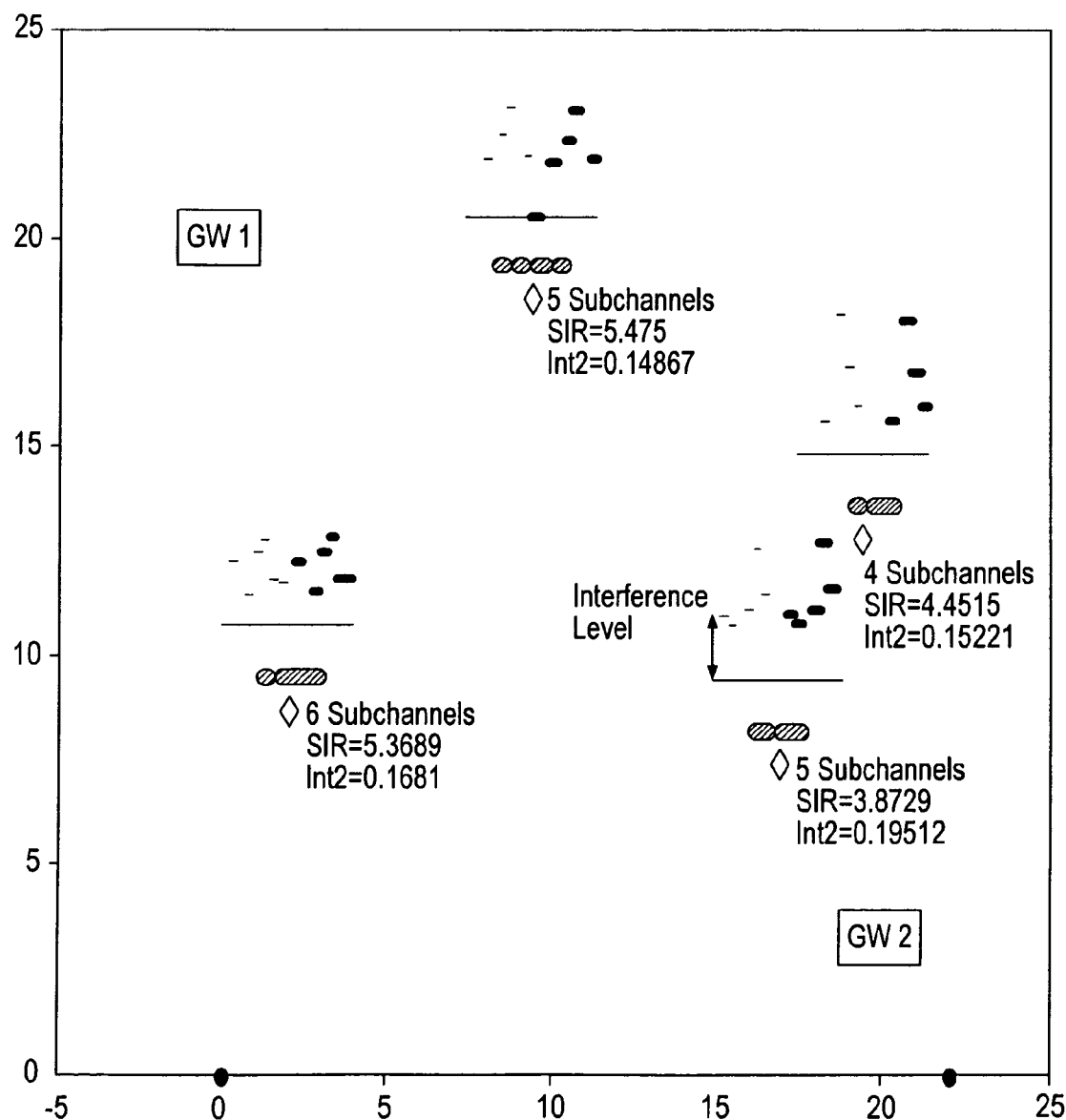

The results depicted in FIGS. 31A and 31B (31A=before GW-to-GW coordination; 31B=after GW-to-GW coordination) show how a method embodying the present invention can succeed in reducing the interference inflicted in each BS and the interference on other transceivers by each transceiver at sub-channel level.

In FIGS. 31A and 31B, the main X and Y axes represent distance (e.g. in kilometres) in a geographical region served by two RANs having gateways GW1 and GW2. A cluster of BSs (transceivers) is shown, each diamond representing a BS located at a particular geographical position for the purposes of the simulation, above which is schematically shown an interference plot (interference level vs. subchannel number). For each BS, the narrow line bar represents the interference inflicted on other BSs on the current sub-channel. The dashed lines represent the interference inflicted on that BS from other BSs on the current sub-channel. The lighter patches in the lower part of each interference plot represent blue subchannels. The darker patches in the upper part of each plot represent red subchannels. Comparing the arrowed lines marked "Interference Level" in FIGS. 31A and 31B respectively, indicates a reduction in interference obtained by applying the method of the present invention.

Figure 32A:
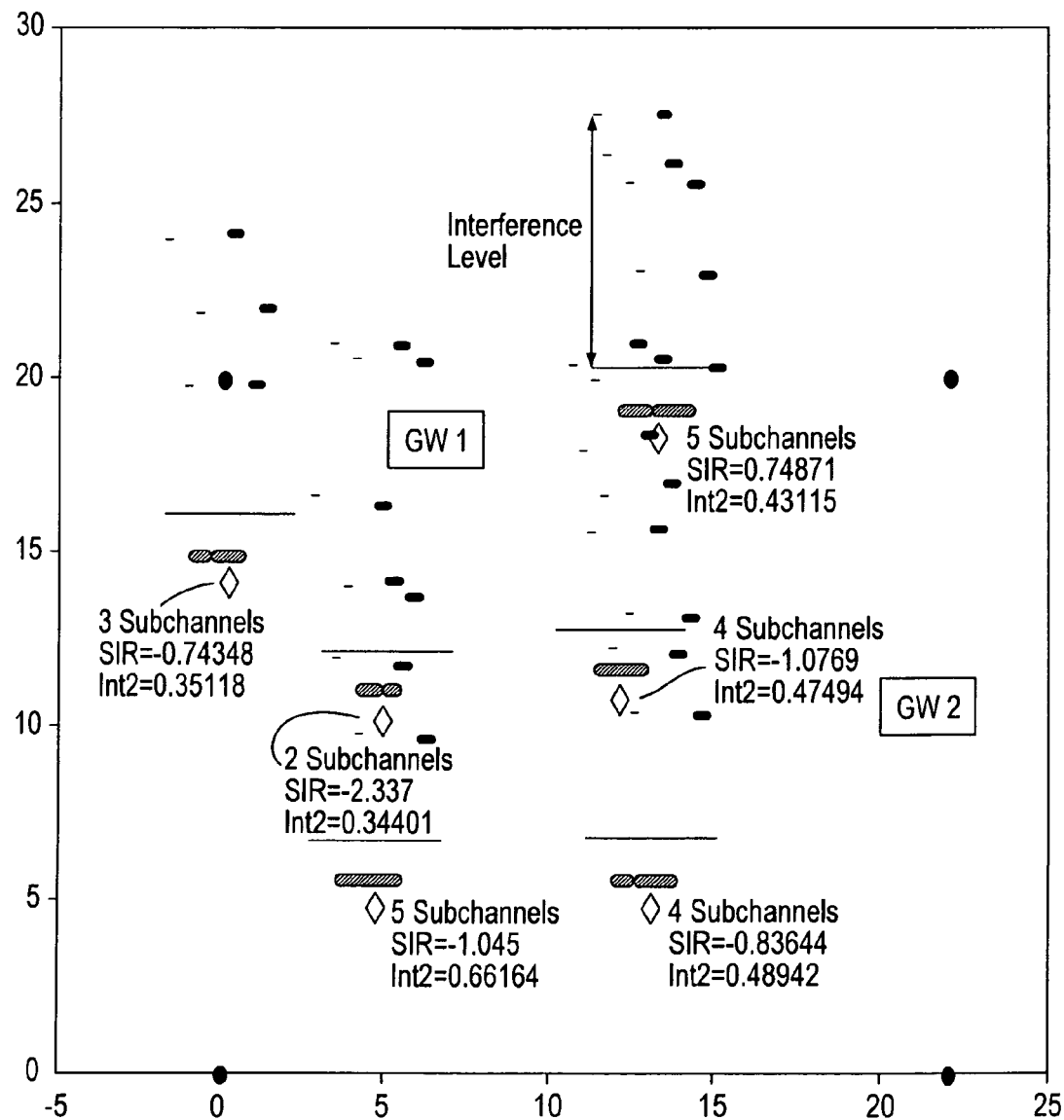
Figure 32B:
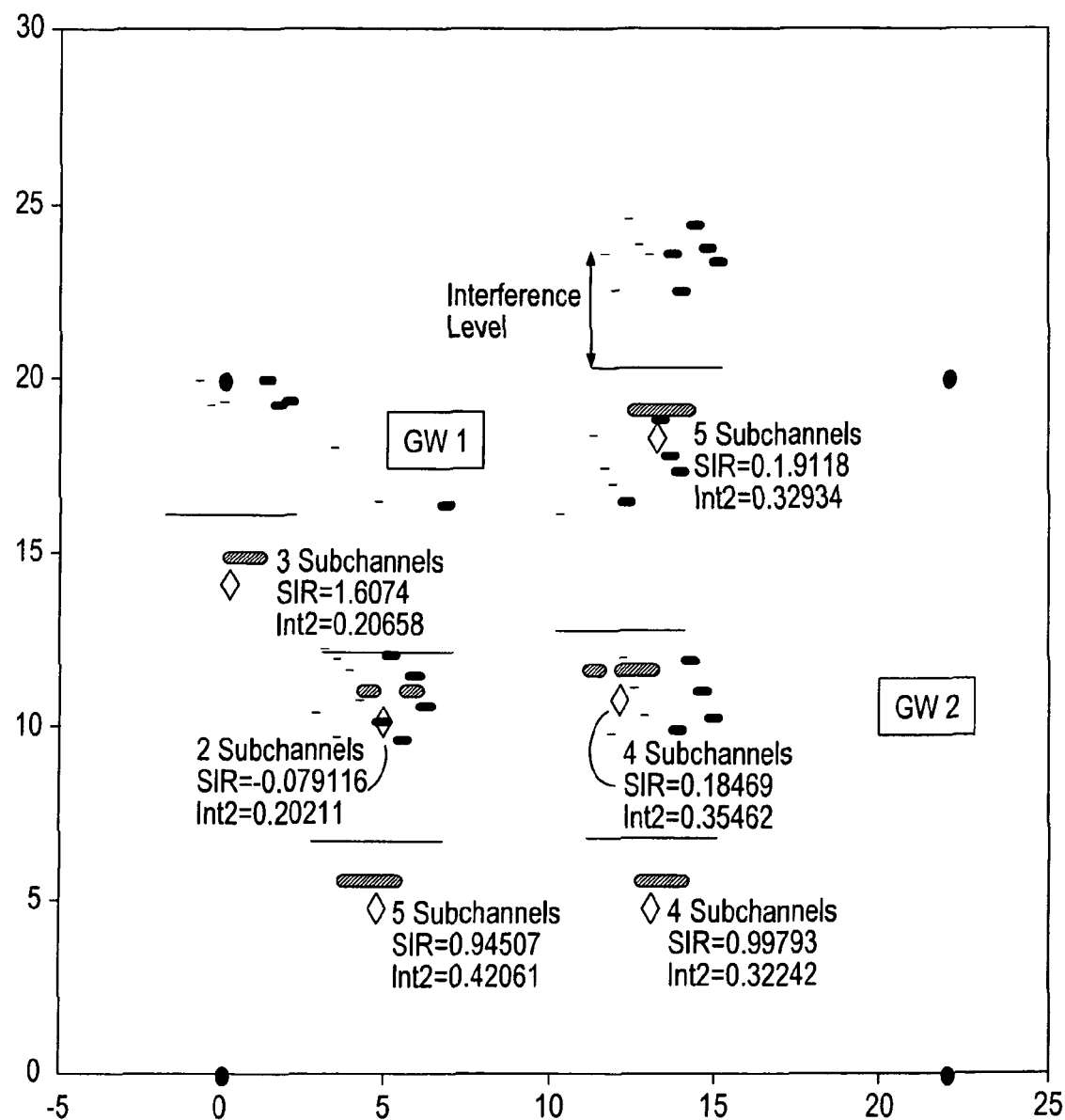

In FIGS. 32A and 32B, another successful scenario is presented. That is, taking a snapshot of results of GW-to-GW coordination, a significant reduction of interference for a cluster of transceivers is observed at the sub-channel level.

To summarise, the method embodying the present invention can provide the following effects:

Firstly, it provides the concept of a unified list of troubled sub-channels in the troubled gateway. Unlike previous proposals in which a preferred channel list is monitored, in the present invention only the information regarding the troubled sub-channels is being monitored and communicated. Typically, this will involve less data than the preferred channel list.

Secondly, it provides a means by which the GW can inform other networks (i.e. potential candidate for future long term and short term spectrum sharing) such as Industrial, Scientific and Medical bands (ISM), or fixed satellite services of the most troubled bands within its own network.

Thirdly, the present invention can allow a GW to inform the overall spectrum policy manager of the troubled sub-channels, for consideration in future dynamic planning of guard bands.

Likewise, the present invention enables a GW to inform the Spectrum Coexistence and Sharing entity of the most troubled sub-channels, allowing the latter to consider them when defining boundaries of the common pool of spectrum, and when redefining guard bands.

Next, the method embodying the present invention involves providing a troubled GW providing a final list of troubled sub-channels to other GWs involved in ST and LT spectrum assignment and sharing process.

The method embodying the present invention uses the concept of coordination between the gateways involved in long term and short term spectrum assignment and sharing processes in terms of the sub-channel allocation and interference mitigation on an intra system or intra RAN basis.

The method embodying the present invention adopts the idea of interference temperature, defining thresholds for two levels of red (high interference) and blue (low interference) for all the involved gateways.

It involves making a comparison between the determined or estimated interference level and the measured interference by the involved nodes (typically, base stations). The concept of separation of in-house and internal interference from the intra system interference is thereby introduced.

The method includes a step of identifying the consistently troubled sub-channels (that is, sub-channels affected by interference, also called "red" sub-channels) in the BSs and sending this information to the network manager (centralized entity) or gateway GW. This "suffering" GW informs other GWs in the system of its problem.

Then, the method embodying the present invention performs a new dynamic centralized channel allocation process based on the knowledge of the troubled channels in the suffering GW by other GWs involved in the ST and LT spectrum assignment and sharing process.

In this centralised dynamic radio channel allocation process, the other GWs involved in the ST and LT spectrum assignment and sharing consider all the possible combinations of sub-channel allocations to base stations, avoiding all the red sub-channels in the list provided by the troubled GW as much as they can.

If one or more red sub-channels are unavoidable, other GWs involved in the ST and LT spectrum assignment and sharing process consider all the combinations of sub-channel allocations to their own BSs employing a minimum number of red sub-channels.

Then, these GWs inform their own BSs of their preferred sub-channel allocation and the troubled GW of the completion of the process Some advantages of adopting the method embodying the present invention are as follows.

(a) As a result of the focus on troubled channels rather than the preferred ones, the signalling overhead required for transfer of the sub-channel information is expected to be less than traditional systems. This is because for a well designed wireless network with sufficient resources and good frequency planning, the number of troubled sub-channels would be expected to be much less than the preferred sub-channels.

(b) In some situations the previously-proposed gateway centralised scheme, in which the gateway GW of one RAN performs channel allocation to its associated base stations independently of the other RANs, might be unable to provide full control on inflicted interference on one RAN. The reason for this is that one GW can only control the channel allocation in its own RAN and has no influence on other RANs. In the present invention, this shortcoming is addressed by enabling GW-to-GW coordination for an efficient interference mitigation and radio sub-channel allocation. Occasional activation and triggering of such GW-to-GW interference coordination provides a further improvement to GW-centralised sub-channel allocations.

(c) The guard bands in co-existing RANs can be modified according to the map and history of the most reported troubled channels either by say a Fixed Satellite Service, or by an ISM network if either type of RAN is present, or by the spectrum manager in a WINNER-type system, to provide a better interference profile.

(d) In addition, again in a WINNER-type scenario or in other systems arranged along similar lines, the boundaries of the shared spectrum can be modified by a Spectrum Sharing and Coexistence (S&C) entity to remove or alter the most troubled sub-channel for good.

(e) The present invention addresses the weaknesses of a distributed dynamic channel allocations, enabling a degree of centralized co-ordination even over very short timescales (i.e. shorter than previously-proposed ST spectrum assignment).

(f) It exploits the further better interference mitigation and radio sub-channel allocation on a multi-RAN multiple system basis to have better and more efficient dynamic radio channel allocations, leading to overall interference reduction in the radio network and specially in the troubled GW.

(g) The cooperative negotiation mechanism of the present invention avoids the potential collision of interests in multiple GWs and multiple RAN.
(h) It provides fairer interference coordination all over the RANs involved in the short term and long term spectrum assignment and sharing process leading to better and more flexible use of common pool of spectrum.
(i) The method may be viewed as providing a further fine tuning to short term spectrum assignment.
(j) The method embodying the present invention can improve the spectrum utilization and interference level in a mobile wireless network, whilst improving the QoS, the overall network coverage, the throughput and whilst reducing call blocking. Revenue can also be improved for spectrum borrowing/lending parties by making sure that radio resource is available and utilized when needed at peak times.

In any of the above aspects, the various features may be implemented in hardware, or as software modules running on one or more processors. In particular, whilst the gateway is depicted in the Figures as a single unit for convenience, the functionality of the GW may be distributed over different locations in the network. For example, certain functions of the GW could be implemented at the level of the BS or spectrum manager. Likewise, the spectrum manager need not be a single unit but may be distributed, for example partly or wholly within the GWs of each RAN.

In the above example, a GW employs one threshold to determine whether to request the BSs to send information on their actual interference levels, and another threshold to determine whether the actual interference significantly exceeds the estimated level. However, in both cases more than one threshold may be employed. For example, a higher threshold may be used to determine whether to perform GW-to-GW coordination more frequently. Alternatively, it might be preferred in some situations to request periodically the actual interference levels at the BSs without first testing an estimate against a threshold level.

Features of one aspect may be applied to any of the other aspects. In particular, the claimed wireless communication system and gateway (network manager) may have any or all of the features of the method and/or system claims.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

The invention claimed is:

1. An interference mitigation method for use in a wireless communication system formed by a plurality of radio access networks, each radio access network having a network manager arranged for communication with a plurality of nodes associated with the network manager, and each radio access network having a frequency spectrum divisible into a plurality of sub-channels used for wireless communication by the nodes, said frequency spectrum at least partly overlapping with the frequency spectrum of one or more of the other radio access networks; the method comprising the steps of:
the network manager of each radio access network performing a spectrum assignment process for allocation of sub-channels to its nodes;
the nodes of each radio access network performing wireless communication using their allocated sub-channels;
the network manager of one radio access network receiving, from its associated nodes, data indicative of an actual level of interference being experienced by the nodes, said interference arising either internally within the radio access network or externally from the other radio access networks;
the network manager of said one radio access network comparing said actual level of interference with an estimated level of interference arising internally within the radio access network to determine whether there is a need for coordination with another network manager to reduce interference arising externally, and if so:
the network manager of said one radio access network notifying this need to the network manager of at least one of the other radio access networks; and
the network manager of said other radio access network performing again the spectrum assignment process to its associated nodes to reduce the level of interference being experienced by the nodes of said one radio access network.

2. The interference mitigation method according to claim 1 wherein the comparing step involves determining whether said actual level of interference exceeds said estimated level by at least a threshold amount.

3. The interference mitigation method according to claim 1 wherein if the network manager of said one radio access network determines there is no need for coordination with another radio access network to reduce the interference, the network manager performs again the spectrum assignment process to its associated nodes in an attempt to reduce the interference arising internally within the radio access network.

4. The interference mitigation method according to claim 1 wherein the nodes are transceivers and said receiving step is initiated by the network manager obtaining said estimated level of interference, detecting that said estimated level exceeds a predetermined level, and requesting the nodes to send said data indicative of the actual level of interference.

5. The interference mitigation method according to claim 1 wherein said data indicative of the actual level of interference being experienced by the nodes includes an identification of sub-channels consistently affected by interference over successive time periods used for communication in the radio access network.

6. The interference mitigation method according to claim 5 wherein the network manager of said one radio access network compiles a list of affected sub-channels and notifies said list to the network manager of said at least one other radio access network, and wherein the network manager of said other radio access network performs the spectrum assignment process based on the list of affected sub-channels.

7. The interference mitigation method according to claim 6 wherein the network manager of said one radio access network further notifies said list to a spectrum manager of the wireless communication system, and further comprising a step of the spectrum manager setting guard bands in said frequency spectrum for one or more of the radio access networks based on the list of affected sub-channels.

8. The interference mitigation method according to claim 6 wherein the network manager of said one radio access network further notifies said list to a sharing entity of the wireless communication system, and further comprising a step of the sharing entity determining sharing of said frequency spectrum or defining spectrum boundaries for the radio access networks based on the list of affected sub-channels.

9. The interference mitigation method according to claim 6 wherein said interference arising externally includes interference caused by assigning the same sub-channels to nodes in different radio access networks, and the network manager of said other radio access network attempts to perform the spectrum assignment process to its associated nodes by avoiding the affected sub-channels.

10. The interference mitigation method according to claim 9 wherein the network manager of said other radio access network performs the spectrum assignment by assigning on a random basis the sub-channels other than the affected sub-channels to its associated nodes.

11. The interference mitigation method according to claim 9 wherein the network manager of said other radio access network first attempts to perform the spectrum assignment completely, considering all possible combinations of the remaining sub-channels, and if this is not possible, performs the spectrum assignment so as to avoid as many as possible of the affected sub-channels.

12. The interference mitigation method according to claim 11 wherein at least one such mobile communication system is a WINNER system, the network manager of which is a gateway of the WINNER system, and the spectrum assignment process performed by the gateway is a dynamic radio channel allocation process of assigning sub-channels to nodes on a time scale shorter than long-term and short-term spectrum assignment.

13. A wireless communication system comprising a plurality of radio access networks, each radio access network having a network manager associated with a plurality of nodes in communication with the network manager, and each radio access network having a frequency spectrum divisible into a plurality of sub-channels for use in wireless communication by the nodes, said frequency spectrum at least partly shared with the other radio access networks; wherein the network manager of each radio access network comprises:
  spectrum assignment means for allocation of sub-channels to its nodes;
  interference estimating means for estimating a level of interference expected to arise internally within the radio access network during said wireless communication;
  comparing means for comparing said estimated level of interference with an actual level of interference affecting the nodes associated with the network manager; and
  notifying means operable, in the event that said actual level exceeds said estimated level by more than a predetermined threshold, to notify at least one of the other network managers of an interference state;
  wherein said spectrum assignment means is responsive to a request from any other network manager to repeat the allocation of sub-channels to its nodes whilst taking into account the interference state notified from that other network manager.

14. A network manager of one of a plurality of radio access networks making up a wireless communication system, comprising:
  means for communicating over a wired or wireless link with each of a plurality of nodes associated with the network manager;
  spectrum assignment means for allocating sub-channels, within a frequency spectrum available for use by the radio access network and at least partly shared with the other radio access networks, to the nodes for their use in wireless communication;
  interference estimating means for estimating a level of interference expected to arise internally within the radio access network in the course of said wireless communication;
  comparing means for comparing said estimated level of interference with an actual level of interference experienced by the nodes in the course of said wireless communication, including both interference arising internally within the radio access network and interference inflicted externally from the other radio access networks; and
  notifying means operable, in the event that said actual level exceeds said estimated level by more than a predetermined threshold, to notify at least one of the other network managers of an interference state;
  wherein said spectrum assignment means is responsive to a notification from any other network manager to repeat the allocation of sub-channels to its nodes whilst taking into account an interference state notified from that other network manager.

15. A non-transitory computer-readable medium on which is recorded software which, when executed on one or more processors on a radio access network, performs the functions of a network manager comprising:
  communicating over a wired or wireless link with each of a plurality of nodes associated with the network manager;
  allocating sub-channels, within a frequency spectrum available for use by the radio access network and at least partly shared with the other radio access networks, to the nodes for their use in wireless communication;
  estimating a level of interference expected to arise internally within the radio access network in the course of said wireless communication;
  comparing said estimated level of interference with an actual level of interference experienced by the nodes in the course of said wireless communication, including both interference arising internally within the radio access network and interference inflicted externally from the other radio access networks; and
  in the event that said actual level exceeds said estimated level by more than a predetermined threshold, notifying at least one of the other network managers of an interference state;
  wherein said spectrum assignment means is responsive to a notification from any other network manager to repeat the allocation of sub-channels to its nodes whilst taking into account an interference state notified from that other network manager.

16. A network manager comprising:
  one or more processors which perform processing for
  communicating over a wired or wireless link with each of a plurality of nodes associated with the network manager of one of a plurality of radio access networks in a wireless communication system,
  allocating sub-channels, within a frequency spectrum available for use by the one of the plurality of radio access networks and at least partly shared with other of the plurality of radio access networks, to the nodes for use in wireless communication, estimating a level of interference expected to arise internally within the one of the plurality of radio access networks in the course of the wireless communication, comparing the estimated level of interference with an actual level of interference experienced by the nodes in the course of the wireless communication, including both interference arising internally within the one of the plurality of radio access networks and interference inflicted externally from the other of the plurality of radio access networks, notifying an interference state, in the event that the actual level exceeds the estimated level by more than a given threshold, to at least one of other network managers, and repeating allocation of sub-channels to the nodes, taking into account an interference state notified from at least one of the other network managers.

* * * * *